US006999662B2

(12) United States Patent
Duguay et al.

(10) Patent No.: US 6,999,662 B2
(45) Date of Patent: *Feb. 14, 2006

(54) SEGMENTED WAVEGUIDE ARRAY GRATING FILTERS

(75) Inventors: Michel A. Duguay, Ste-Foy (CA); Étienne Grondin, Sherbrooke (CA)

(73) Assignee: Université Laval, Québec (CA)

( * ) Notice: Subject to any disclaimer, the term of this patent is extended or adjusted under 35 U.S.C. 154(b) by 79 days.

This patent is subject to a terminal disclaimer.

(21) Appl. No.: 10/494,040

(22) PCT Filed: Nov. 15, 2002

(86) PCT No.: PCT/CA02/01752

§ 371 (c)(1),
(2), (4) Date: May 10, 2004

(87) PCT Pub. No.: WO03/042737

PCT Pub. Date: May 22, 2003

(65) Prior Publication Data

US 2004/0258358 A1    Dec. 23, 2004

Related U.S. Application Data

(60) Provisional application No. 60/331,390, filed on Nov. 15, 2001, provisional application No. 60/331,389, filed on Nov. 15, 2001.

(51) Int. Cl.
*G02B 6/26* (2006.01)
*G02B 6/34* (2006.01)
(52) U.S. Cl. ............................ 385/39; 385/129; 385/37
(58) Field of Classification Search .................... 385/1, 385/10, 31, 37, 39, 129–132; 359/572, 575
See application file for complete search history.

(56) References Cited

U.S. PATENT DOCUMENTS

| 3,529,205 A | 9/1970 | Miller |
| 3,970,959 A | 7/1976 | Wang et al. |
| 4,687,286 A | 8/1987 | Winful |
| 4,725,110 A | 2/1988 | Glenn et al. |
| 4,807,950 A | 2/1989 | Glenn et al. |

(Continued)

FOREIGN PATENT DOCUMENTS

EP    0 761 616 A    3/1997

(Continued)

OTHER PUBLICATIONS

Wong V V et al., "Ridge-Waveguide Sidewall-Grating Distributed Feedback Structures Fabricated By X-Ray Lithography", Journal of Vacuum Science and Technology, Part B, American Institute of Physics, NY, vol. 11, No. 6, Nov. 1, 1993.

(Continued)

*Primary Examiner*—Sarah Song
(74) *Attorney, Agent, or Firm*—Ogilvy Renault, LLP; Isabelle Chabot

(57) ABSTRACT

An optical device for filtering an optical signal is described. The optical filtering device comprises an optical input receiving the optical signal; an elongated waveguide connected to the input and having a modified transverse dimension to create a series of partially reflective segments having predetermined effective indices of refraction ($n_{eff}$) with a distribution within the waveguide to provide the filtering of the optical signal, wherein the segments are designed for single mode operation and wherein a reflected filtered output optical signal is generated, wherein the transverse dimension varies within a narrow range over which a transverse size of the mode remains close to its minimum value; an optical output connected to the waveguide for providing the filtered optical signal.

15 Claims, 30 Drawing Sheets

U.S. PATENT DOCUMENTS

| | | | |
|---|---|---|---|
| 4,859,013 | A | 8/1989 | Schmitt et al. |
| 4,914,665 | A | 4/1990 | Sorin |
| 5,276,748 | A | 1/1994 | Magel |
| 5,278,926 | A | 1/1994 | Doussiere |
| 5,285,274 | A * | 2/1994 | Tanno et al. ............... 385/129 |
| 5,333,216 | A | 7/1994 | Oda et al. |
| 5,400,422 | A | 3/1995 | Askins et al. |
| 5,502,779 | A | 3/1996 | Magel |
| 5,526,450 | A | 6/1996 | Kester et al. |
| 5,641,956 | A | 6/1997 | Vengsarkar et al. |
| 5,796,891 | A | 8/1998 | Poustie et al. |
| 5,818,988 | A | 10/1998 | Modavis |
| 5,822,479 | A | 10/1998 | Napier et al. |
| 5,903,683 | A | 5/1999 | Lowry |
| 6,021,242 | A | 2/2000 | Harumoto et al. |
| 6,047,096 | A | 4/2000 | Augustsson |
| 6,058,226 | A | 5/2000 | Starodubov |
| 6,067,391 | A | 5/2000 | Land |
| 6,214,495 | B1 | 4/2001 | Segawa et al. |
| 6,269,205 | B1 | 7/2001 | Peral et al. |
| 6,310,995 | B1 | 10/2001 | Saini et al. |
| 6,317,539 | B1 * | 11/2001 | Loh et al. .................. 385/37 |
| 2001/0031114 | A1 | 10/2001 | Kashyap |
| 2001/0051020 | A1 | 12/2001 | Kashyap |
| 2001/0051021 | A1 | 12/2001 | Gaylord et al. |
| 2002/0015549 | A1 | 2/2002 | Pan et al. |

FOREIGN PATENT DOCUMENTS

| | | |
|---|---|---|
| EP | 0 810 454 A | 12/1997 |
| GB | 2 174 212 | 10/1986 |
| WO | WO 99 42899 A | 8/1999 |
| WO | WO 01 11401 A | 2/2001 |

OTHER PUBLICATIONS

Gong J. et al., "Analysing Distributed Feedkack Waveguides", IEE Proceedings; Optoelectronics, Institution of Electrical Engineers, Stevenage, GB, vol. 146, No. 6, Dec. 14, 1999.

Livingston et al., "Planar Diffraction Grating for Board-Level WDM Applications", Proceedings of MPPOI 1996, p.p. 77-84, Institute of Electrical and Electronics Engineers, Inc.

Mossberg, "Lithographic Holography In Planar Waveguides", Nov. 2001, vol. 12, No. 2, SPIE's International Technical Group Newsletter.

Cohn et al., "Nanolithography Considerations for Multi-Passband Grating Filters" Optical Review, vol. 6, No. 4 (1999), pp. 345-354, Japan.

Murphy, "Design, Fabrication and Measurement of Integrated Bragg Grating Optical Filters", (slides presented at thesis defense available from Internet at http://nanoweb.mit.edu/users/tem/phdthesis) Feb. 2001, Massachusetts Institute of Technology.

Murphy et al., "Design of Integrated Bragg Grating-Based Filters for Optical Communications", NanoStructures Laboratory Annual Report 2000, Massachusetts Institute of Technology, Apr. 19, 2000.

Murphy et al., "Design of Integrated Bragg Grating-Based Filters for Optical Communications", NanoStructures Laboratory Annual Report 2001, Massachusetts Institute of Technology, Aug. 1, 2001.

* cited by examiner

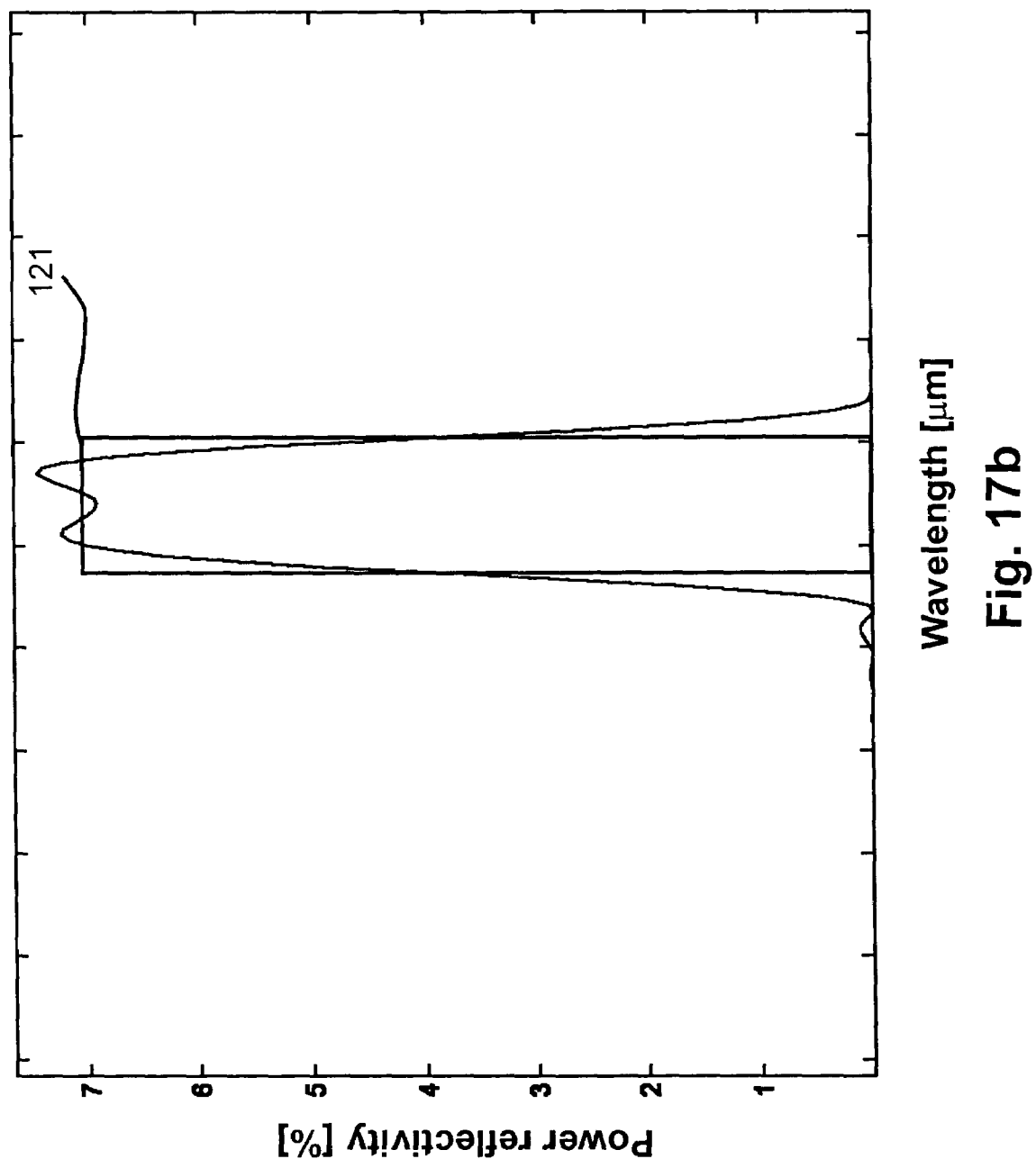

SEGMENTED WAVEGUIDE ARRAY GRATING FILTERS

CROSS-REFERENCE TO RELATED APPLICATIONS

This application is a national phase entry of PCT/CA02/01752 filed on Nov. 15, 2002, currently pending in the international phase which in turn claims priority on U.S. provisional patent application Ser. No. 60/331,390 and U.S. provisional patent application Ser. No. 60/331,389 both filed Nov. 15, 2001 by Applicant. This application is further related to co-pending U.S. patent application Ser. No. 10/294,915 filed on Nov. 15, 2002 by Applicant.

FIELD OF THE INVENTION

The invention relates to filtering components in optical waveguides. More specifically, it relates to a segmented waveguide array grating.

BACKGROUND OF THE INVENTION

Filtering components which can be incorporated in optical waveguides have been the focus of increasing attention in the last two decades. The outstanding example at the moment is the Bragg grating which is directly written into optical fibers in order to fulfill various filtering functionalities such as laser frequency stabilization, gain equalization in erbium-doped fiber amplifiers, and channel adding or dropping in wavelength multiplexed optical networks.

The essential feature of a Bragg grating is a locally periodic variation in the refractive index profile that is incorporated into the waveguide along the propagation direction. Serious problems arise when one wants to superimpose several such Bragg gratings in order to filter several wavelengths. In the case where Bragg gratings are written into a fiber through the UV holographic technique, one observes that the Bragg gratings interfere with each other, the reflectivity peaks of earlier gratings being displaced by the ones written later. This mutual interference is due in part to the saturation of the UV-induced change in the refractive index and to the DC (or nonsinusoidal) component of the UV-induced change in refractive index.

Another serious drawback of Bragg grating technology in optical fibers is the limitation of the refractive index modulation to the $10^{-4}$–$10^{-3}$ range.

In semiconductor lasers another technique has been used in order to create Bragg gratings, that being to introduce a periodic corrugation in one of the layers constituting the semiconductor laser waveguide. This corrugation modulates in a locally periodic way the effective index profile of the laser waveguide thereby achieving the same effect as modulating the index of refraction in fiber Bragg gratings. The same problems arise with this corrugation technique as with the fiber Bragg technique when one wants to physically superimpose several gratings.

SUMMARY OF THE INVENTION

It is therefore an object of the present invention to provide a filter which can be precisely spectrally tailored to output a desired filtered signal.

This patent application describes a new type of optical waveguide filter which displays precisely tailored spectral properties of interest to optical communications and to spectroscopy. The waveguide filter consists of a sequence of segments whose transverse and longitudinal dimensions are precisely calculated and fabricated so that the reflections at the interfaces between different segments will coherently interfere in a predictable fashion in order to give the filtering functionality looked for. The segments are designed for single mode operation with transverse dimensions varying within a narrow range over which the mode's transverse size remains close to its minimum value. This mode matching condition assures that a sufficiently large reflection takes place at the interface while minimizing the loss of light due to coupling to radiative modes. Distinct subsets of interfaces between different segments are responsible for distinct features in the segmented waveguide's reflection spectrum, some of which are those produced in the prior art by waveguide gratings, such as the Bragg and the sampled Bragg gratings. The new device is referred to as a "segmented waveguide array grating" giving rise to the acronym (and word) "Swag". Examples are given of filtering functionalities which can be precisely designed with the Swag approach; these include spectrally sharp reflectivity peaks for single channel add/drop applications, nearly rectangular spectral pass-bands (for de/multiplexing blocks of wavelengths in optical communications), the possibility of interleaving many individual Swag gratings in the same physically restricted length of waveguide while keeping nearly ideal reflection properties, gain flattening and dispersion compensation in fiber optics, and archival memory applications. Swags are to be fabricated by means of modern nanolithographic techniques and are to be used in reflection using directional couplers or optical circulators on the input side, and/or in transmission as in-line devices.

According to a broad aspect of the present invention, there is provided an optical device for filtering an optical signal, comprising: an optical input receiving the optical signal; an elongated waveguide connected to the input and having a modified transverse dimension to create a series of partially reflective segments having predetermined effective indices of refraction ($n_{eff}$) with a distribution within the waveguide to provide the filtering of the optical signal, wherein the segments are designed for single mode operation and wherein a reflected filtered output optical signal is generated, wherein the transverse dimension varies within a narrow range over which a transverse size of the mode remains close to its minimum value; an optical output connected to the waveguide for providing the filtered optical signal.

According to another first broad aspect of the present invention, there is provided a method for filtering an optical signal, comprising: receiving the optical signal at an input; providing an elongated waveguide connected to the input and having a modified transverse dimension to create a series of partially reflective segments having predetermined effective indices of refraction ($n_{eff}$) with a distribution within the waveguide to provide the filtering of the optical signal, wherein the segments are designed for single mode operation, wherein the transverse dimension varies within a narrow range over which a transverse size of the mode remains close to its minimum value; and outputting the filtered optical signal through an output connected to the waveguide.

According to a further broad aspect of the present invention, there is provided a method of fabrication of a optical filter, comprising: providing an elongated waveguide; modifying a transverse dimension along the elongated waveguide to create a series of segments having predetermined effective indices of refraction ($n_{eff}$) with a distribution within the waveguide to provide the filtering of an optical signal.

According to still another broad aspect of the present invention, there is provided a method of designing an optical filter, the optical filter having an optical input receiving the optical signal, an elongated waveguide connected to the input and having a modified transverse dimension to create a series of partially reflective segments having predetermined effective indices of refraction ($n_{eff}$) with a distribution within the waveguide to provide the filtering of the optical signal, wherein the segments are designed for single mode operation and wherein a reflected filtered output optical signal is generated and an optical output connected to the waveguide for providing the filtered optical signal, the method comprising: providing a desired spectral response; calculating a transverse dimension profile as a function of the desired spectral response.

BRIEF DESCRIPTION OF THE DRAWINGS

These and other features, aspects and advantages of the present invention will become better understood with regard to the following description and accompanying drawings wherein:

FIG. 10b shows a Zoom of a section of the individual SWAG grating made up of quarter-wave stubs of FIG. 10a;

FIG. 12b shows a Zoom of a section of the interlaced SWAGs of FIG. 12a;

FIG. 14b shows a Zoom of a section of the interlaced SWAGs of FIG. 14a;

FIG. 16b shows a Zoom of a part of the three interleaved planar aluminosilicate/silica waveguide based quarter-wave stub Swags of FIG. 16a;

FIG. 17b shows a Zoomed plot of a reflection peak of the power reflectivity for the SWAG filter of FIGS. 16a and 16b;

DETAILED DESCRIPTION OF THE PREFERRED EMBODIMENT

Figure 1:
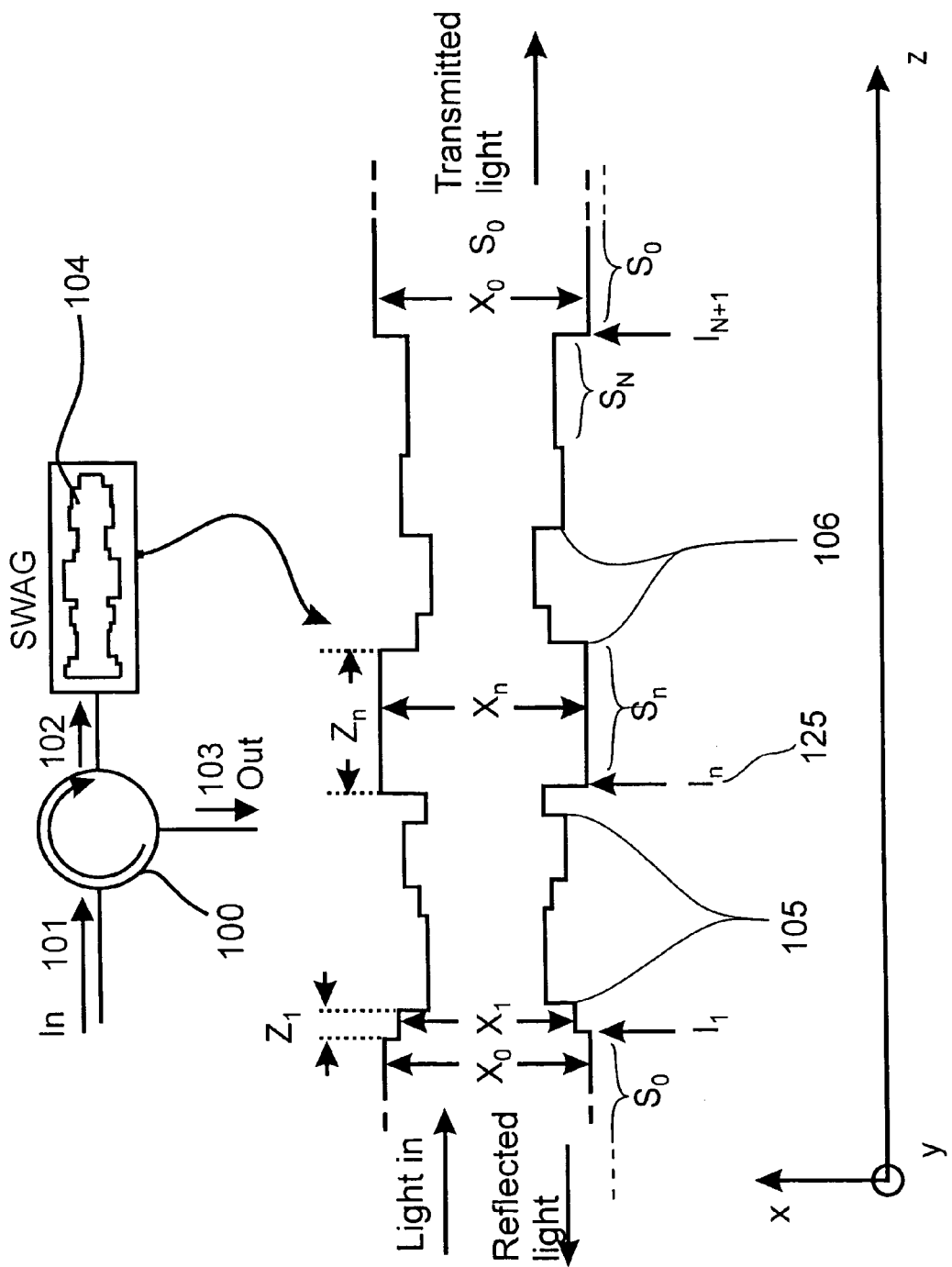
FIG. 1 shows a three-port optical circulator on the input side permits the use of the SWAG filter in reflection. The SWAG filter is made up of segments of width $X_n$ and of length $Z_n$ along the propagation direction Z.
Figure 4:
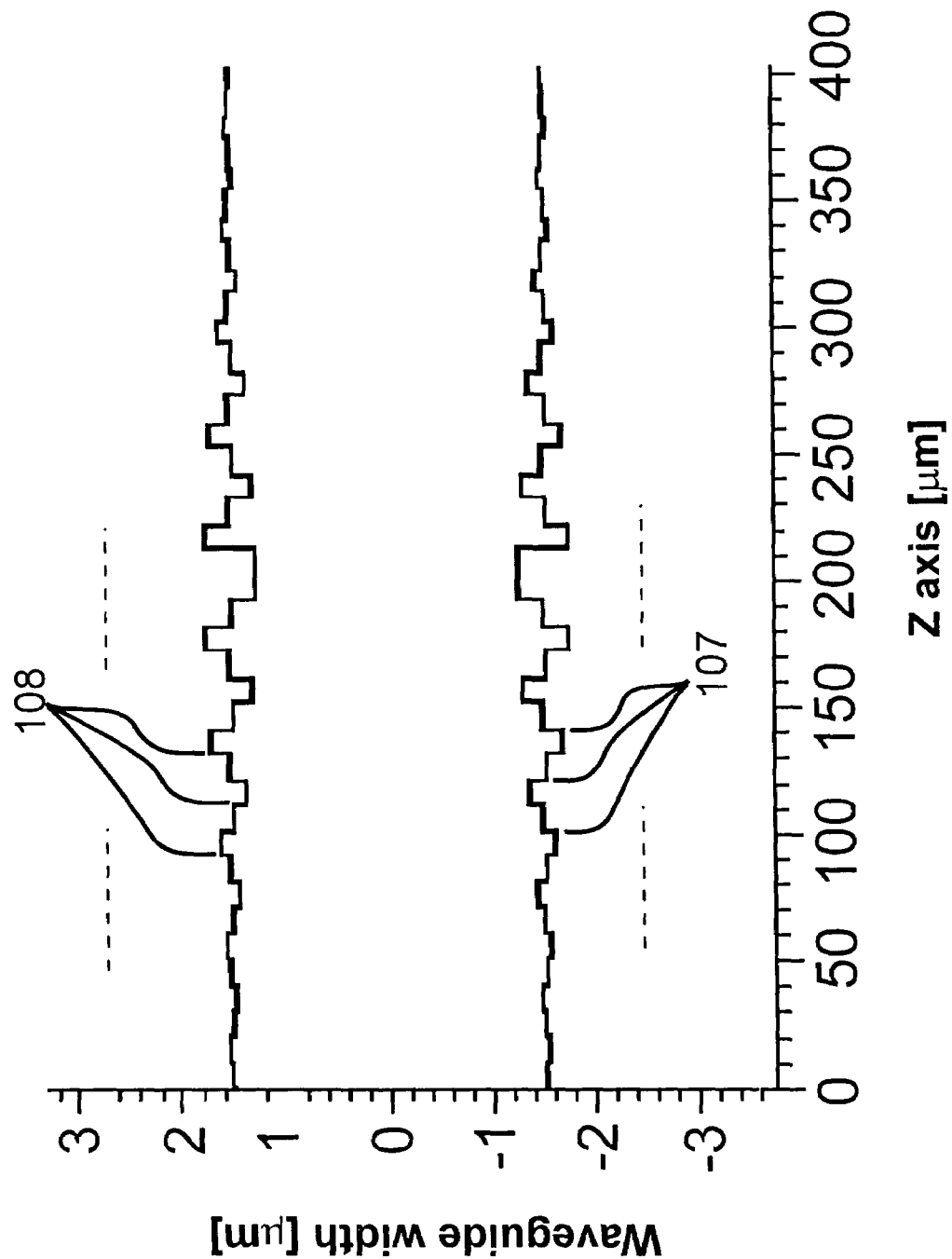
FIG. 4 shows a Lateral dimension along the X axis (core width) as a function of distance Z for two interlaced planar waveguide-based apodized hi-lo Swags.

A so-called "segmented waveguide array grating" (acronym and word Swag) approach is described for incorporating filtering elements in optical waveguides. The Swag filter as illustrated in FIG. 1 is a linear array $\{s_1, s_2, \ldots, s_n, \ldots, s_N\}$ of N waveguide segments whose optical reflective (and therefore transmissive) properties are determined by the coherent addition of reflections from the set of sharp interfaces $\{I_1, I_2, \ldots, I_n, \ldots, I_{N+1}\}$ between segments, where for nomenclature interface $I_n$ is assigned to the first interface of segment $s_n$, as seen by light entering from left. The non-varying waveguide at the input and at the output ends of the Swag grating is labeled by $s_0$. FIG. 1 shows a Swag filter 104 used in conjunction with an optical circulator 100 in order for input light in the first port 101 of the circulator 100 to be coupled into the Swag filter 104 through the second port 102, reflected from it and recovered for output at the third port 103 of the optical circulator 100. FIG. 4 illustrates another Swag which displays the spectral reflectivity response shown in FIG. 5 for the 1500–1600 nm band of wavelengths.

Each segment $s_n$ in a Swag filter has uniform lateral dimensions over its length $Z_n$ along the propagation axis Z. The lateral dimensions $X_n$ and $Y_n$ (radius $R_n$ for cylindrical waveguides) change abruptly as light goes from one segment $s_{n-1}$ to the next segment $s_n$, so that a reflection occurs at the interface $I_n$. By an abrupt change it is meant that the change in transverse dimensions occurs along axis z in less than about one tenth of one wavelength of light in the medium, e.g. in less than about 100 nm for infrared light in the 1500–1600 nm band in aluminosilicate/silica waveguides. The lateral dimensions of the waveguide segments are chosen within a narrow range of values such that the waveguide supports a single mode (the fundamental mode) and such that the mode's transverse dimensions (or the mode's diameter in the case of cylindrical waveguides) changes only slightly (typically less than 5%) in going from one segment to the next. This approximate mode size matching condition minimizes the loss of energy through mode coupling to radiative modes.

In general a desired feature within the reflection spectrum of a Swag filter, say a narrow reflection peak or a rectangular window centered at a given wavelength $\lambda_m$ (m denotes the mth spectral feature), will depend on the precise positioning of a subset $\{I_{m,k1}, I_{m,k2}, I_{m,k3}, \ldots, I_{m,kK}\}$ of K interfaces in the set $\{I_1, I_2, I_3, \ldots, I_{N+1}\}$ of all N+1 interfaces comprised in the complete Swag filter structure. Index labels k1, k2, k3, . . . , kK above are a subset of the integers found in the sequence 1, 2, 3, . . . , N+1. The label number K is less than N+1; in many cases K may be approximately one half, or one third, or one fourth of N.

In general the positioning of the interfaces in subset $\{I_{m,k1}, I_{m,k2}, I_{m,k3}, \ldots, I_{m,kK}\}$ will not be strictly periodic in terms of physical distance; instead, the precise positioning of the knth interface $I_{m,kn}$ will critically depend on the lateral and longitudinal dimensions of all upstream segments in the input light path and on the particular filtering functionality that one is looking for. In certain cases and for certain spectral features, like a sharp reflection peak at wavelength $\lambda_m$, the interfaces of the corresponding subset $\{I_{m,k1}, I_{m,k2}, I_{m,k3}, \ldots, I_{m,kK}\}$ will be periodic in terms of the optical path length at wavelength $\lambda m$ between them. The optical path length $OPL_n$ of segment $s_n$ of length $Z_n$ is equal to the product $n_{eff}(X_n, Y_n, \lambda_m) \times Z_n$ (or $n_{eff}(R_n, \lambda_m) \times Z_n$ in the case of cylindrical segments). Because of their grating-like spectral properties such subsets of interfaces will be referred to as individual Swag gratings, or simply Swag gratings for brevity. In general a complete Swag filter will comprise several such subsets, i.e. several individual Swag gratings.

The precise optical path lengths introduced by each segment can be accurately calculated thanks to current state-of-the-art mathematical techniques for calculating the propagation constants of optical waveguides. These techniques are incorporated in computational software now commercially available from firms such as Optiwave (Canada), R-Soft (USA), and PhotonDesign (England). Among other things these software programs will calculate the propagation constants of different types of waveguides with a high accuracy. The propagation constant of the fundamental mode $\beta$ is given by:

$$\beta = n_{eff} k_0 \quad (1)$$

where $n_{eff}$ is the mode's effective index at a given wavelength, with $k_0$ equal to $2\pi/\lambda_0$, where $\lambda_0$ is the given wavelength of the light in vacuum, $k_0 = \omega/c$, where $\omega$ is the angular frequency of the light and c is the speed of light, viz. 299 792 458 m/s.

The optical path length that lies between interfaces $I_{m,k2}$ and $I_{m,k3}$, as an example, will be the summation of the optical path lengths of all segments encountered by light between these two interfaces. This is given by:

$$OPL(I_{m,k2} \to I_{m,k3}) = \sum_{i=k2}^{i=k3-1} n_{eff}(X_i, Y_i, \lambda_m) \times Z_i \quad (2)$$

with similar expressions for other pairs of interfaces. In the design of a sharp reflection peak at wavelength $\lambda_m$ the optical path length between consecutive interfaces of subset $\{I_{m,k1}, I_{m,k2}, I_{m,k3}, \ldots, I_{m,kK}\}$ will be designed and fabricated to be an integral number of half-waves at $\lambda_m$ when the two consecutive interfaces 105 in the subset have interface reflection coefficients of the same sign (see FIG. 1). When the two consecutive interfaces 106 in the subset have reflection coefficients of opposite signs the optical path length between them will be designed to be an odd number of quarter wavelengths at $\lambda_m$ (see FIG. 1). Expressed in terms of radians of angular distance in the complex plane, for input light at $\lambda_m$ the phase difference between reflections from a pair of consecutive interfaces in that subset will be designed to be an integer number times 2 90 radians. This way all reflections from the interfaces of subset $\{I_{m,k1}, I_{m,k2}, I_{m,k3}, \ldots, I_{m,kK}\}$ interfere constructively giving rise to a sharp reflectivity peak at $\lambda_m$.

Figure 2:
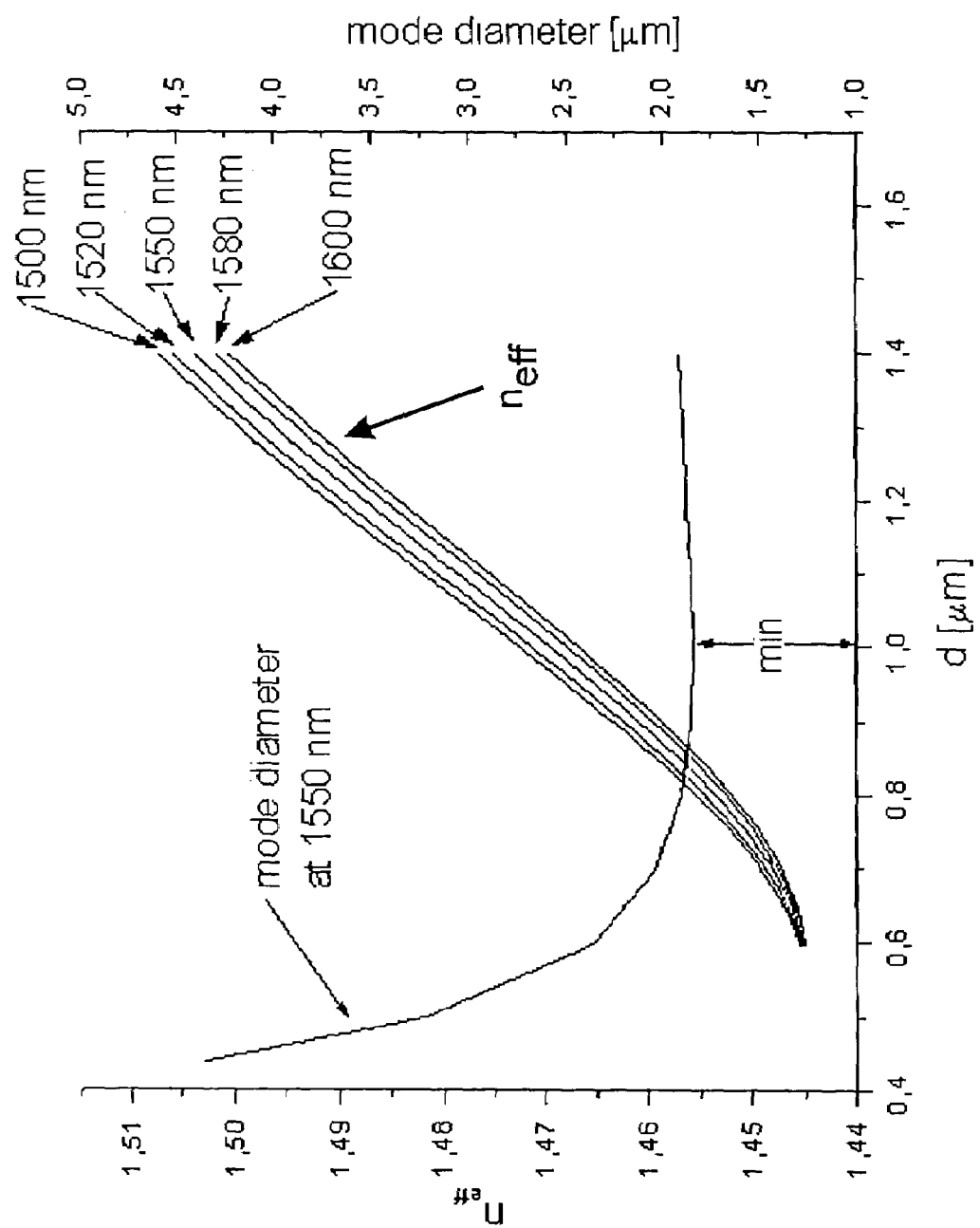
FIG. 2 shows a Plot of the mode dimension at 1550 nm and the effective index for few wavelengths as a function of a cylindrical aluminosilicate/silica core diameter.

A plot of the effective index $n_{eff}$ and of the mode's diameter as a function of core diameter d is shown in FIG. 2 for a cylindrical waveguide having an aluminosilicate core and a pure silica cladding. The aluminosilicate core has a refractive index $n_c = 1.6$, and the silica cladding has refractive index $n_g = 1.444$. Plots have been calculated for 5 different wavelengths in the 1500–1600 nm band. One can see that over the maximum range of core diameters considered here, which is from 0.9 to 1.2 microns, the effective index $n_{eff}$ increases monotonically by about $\Delta n_{eff} = 0.025$.

Figure 3:
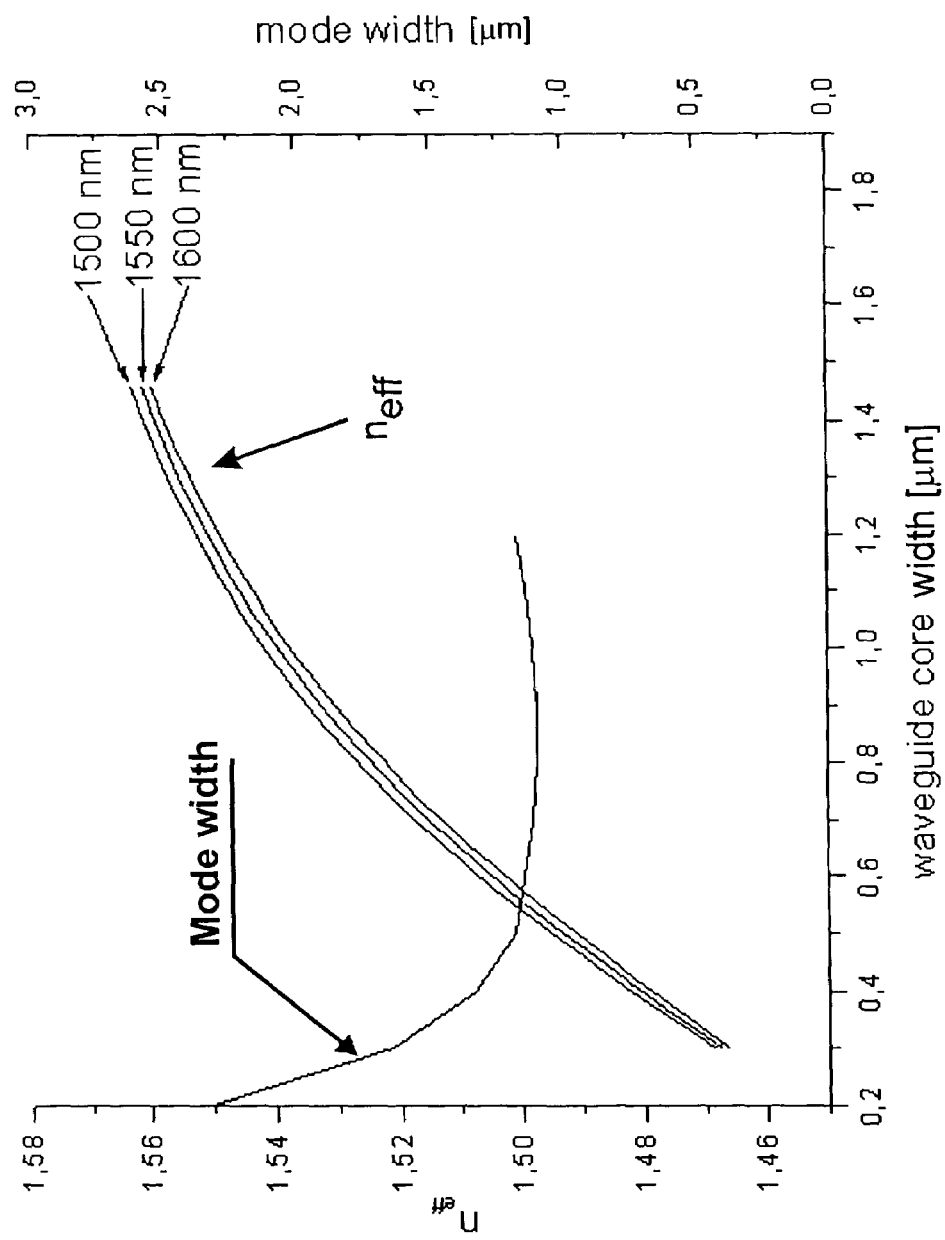
FIG. 3 shows a Plot of the mode dimension at 1550 nm and the effective index for few wavelengths as a function of a symmetrical planar aluminosilicate/silica core width.

While a good number of calculations have been made for cylindrical waveguides, most of the calculations presented here are for planar waveguides where the dimension along Y is considered infinite and the transverse dimension along X is varying along Z to achieve the desired filtering functionality. This has been done only to simplify the calculations and the mode's propagation $\beta$ constant ($\beta = n_{eff} k_0$) would be precisely calculated taking into account finite Y dimension. In fact it is probable that in general both dimensions of a nth segment would be accurately fabricated to achieve a desired effective index of refraction profile in order to achieve the desired precise filtering functionality. In practice, waveguides with a rectangular cross-section would be built using lithographic techniques. In the case of a planar segmented waveguide FIG. 3 shows a plot of the effective index $n_{eff}$ and of the mode's width along the transverse X direction as a function of the core's width (or thickness) along axis X. The word width is used here for convenience, but the reader should understand that it simply refer to the transverse dimension. The core is aluminosilicate and the cladding is pure silica as before. One can see that over the maximum range of core thickness (or width) considered here, which is from 0.7 to 1.1 microns, the effective index $n_{eff}$ increases monotonically by about $\Delta n_{eff} = 0.018$.

The Swag approach allows one to calculate precisely at the design stage the filtering properties that the complete Swag filter will exhibit, no matter how complex. With the Swag approach it becomes possible to superimpose in a predictable manner several grating-type filtering functionalities for several sets of wavelengths, thus overcoming the serious difficulties encountered with attempts to superimpose the traditional fiber Bragg gratings. Moreover the Swag approach allows one to design pass-band filters presenting a nearly rectangular spectral window, a feature which is very useful in modern multiwavelength communications systems.

Figure 8:
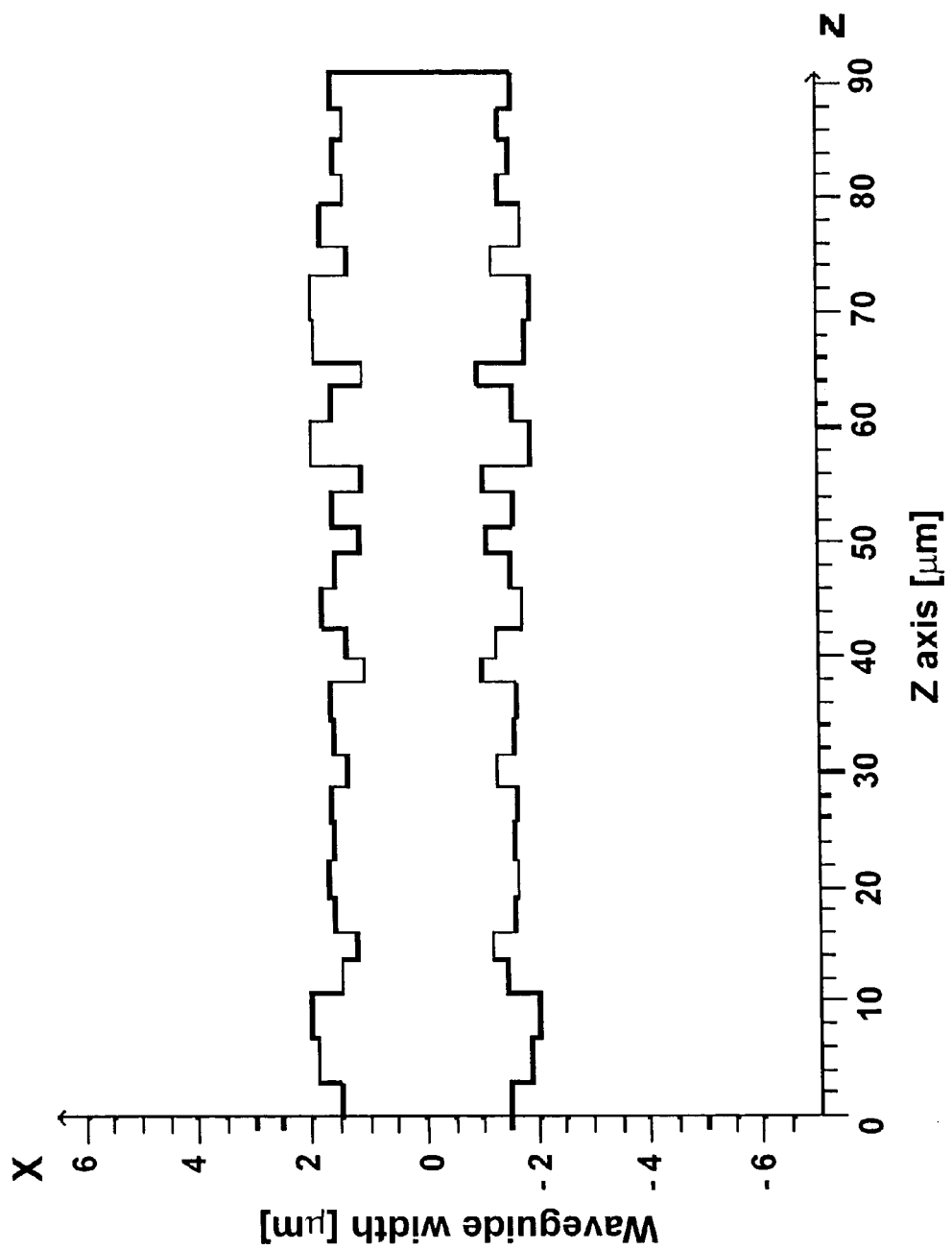
FIG. 8 shows a Planar waveguide based arbitrary Swag.

FIG. 8 illustrates a Swag filter consisting of an arbitrary sequence of planar segments with various lengths and various widths. This example was calculated for planar step waveguides with an infinite Y dimension. The core's refractive index is 1.45, the cladding's is 1.444. From such an example and others (not shown) one can see that a large variety of spectral reflectivity profiles can be obtained by varying the lengths (along axis Z) and the widths (along axis X) of the waveguide segments (see FIG. 9a and FIG. 9b for spectral reflectivity). The positions of the interfaces along Z determine the delays which reflected light waveforms undergo and the change in refractive index at each interface $I_n$ determines the coefficient $r_n$(<--- $I_n$) for the amplitude of the reflected optical electric field according to this formula:

An approximation for r is $r = \Delta n_{eff}/2n_{eff}$, where $\Delta n_{eff}$ is the numerator in $$r_n(\overset{I_n}{\leftarrow}) = \frac{n_{eff}(S_{n+1}) - n_{eff}(S_n)}{n_{eff}(S_{n+1}) + n_{eff}(S_n)} \quad (3)$$

equation (3). For the aluminosilicate core/silica cladding waveguides considered here the reflection coefficients are in the range $-0.01 < r < +0.01$ so that multiple reflections need not to be taken into account since a triply reflected light component (directed towards the left) would be about one thousandth or less in amplitude compared to the first reflection. For implementations where silicon is the waveguide's core (refractive index about 3.5 in the infrared) and silica or air is the cladding, the larger reflection coefficients would give rise to significant multiple reflections. One would then have to take these into account when computing the reflection and transmission properties of the Swag filters.

Figure 9A:
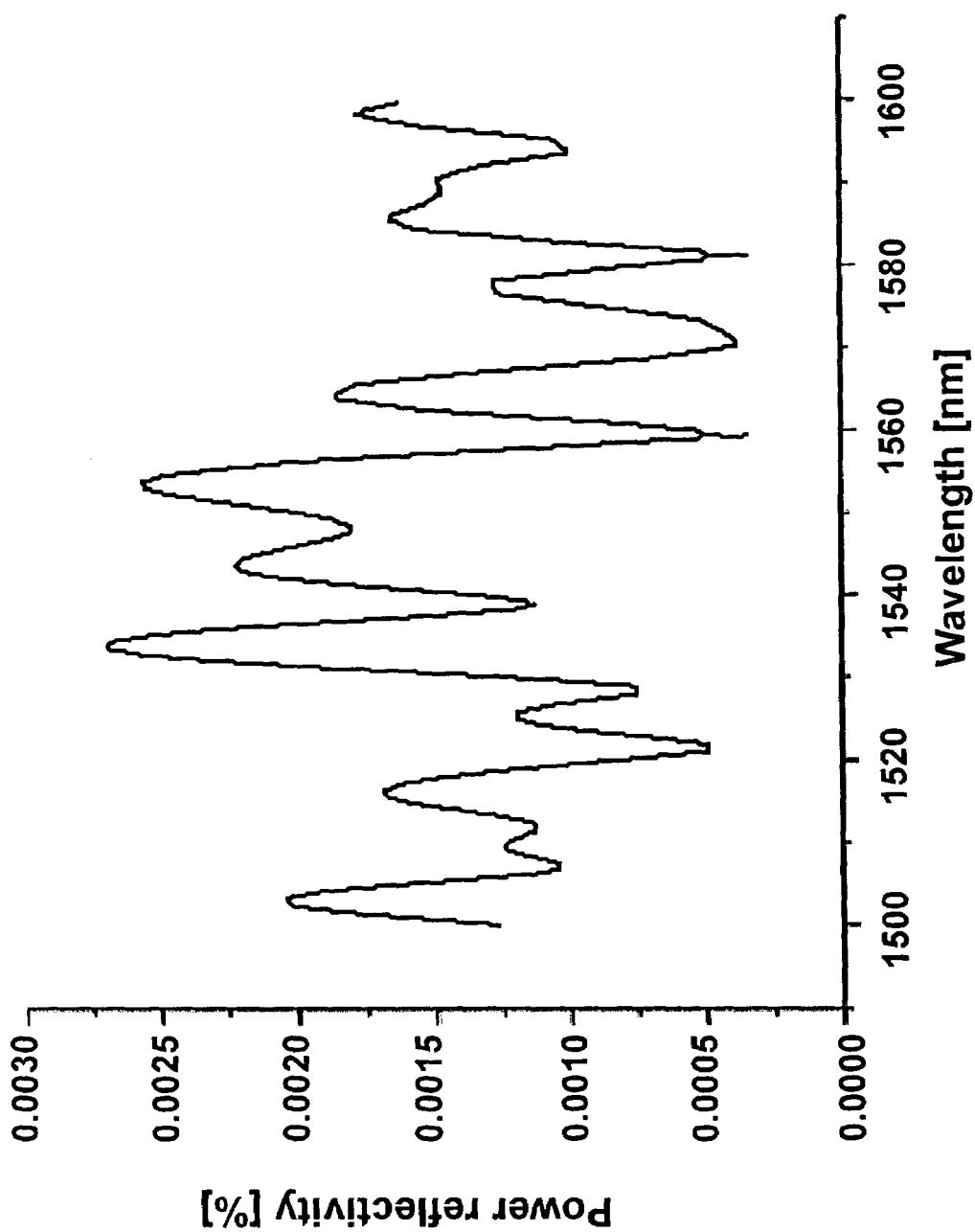
FIG. 9a shows a Power reflectivity of the arbitrary Swag of FIG. 8, obtained with the FIMMprop 3D software from PhotonDesign.
Figure 9B:
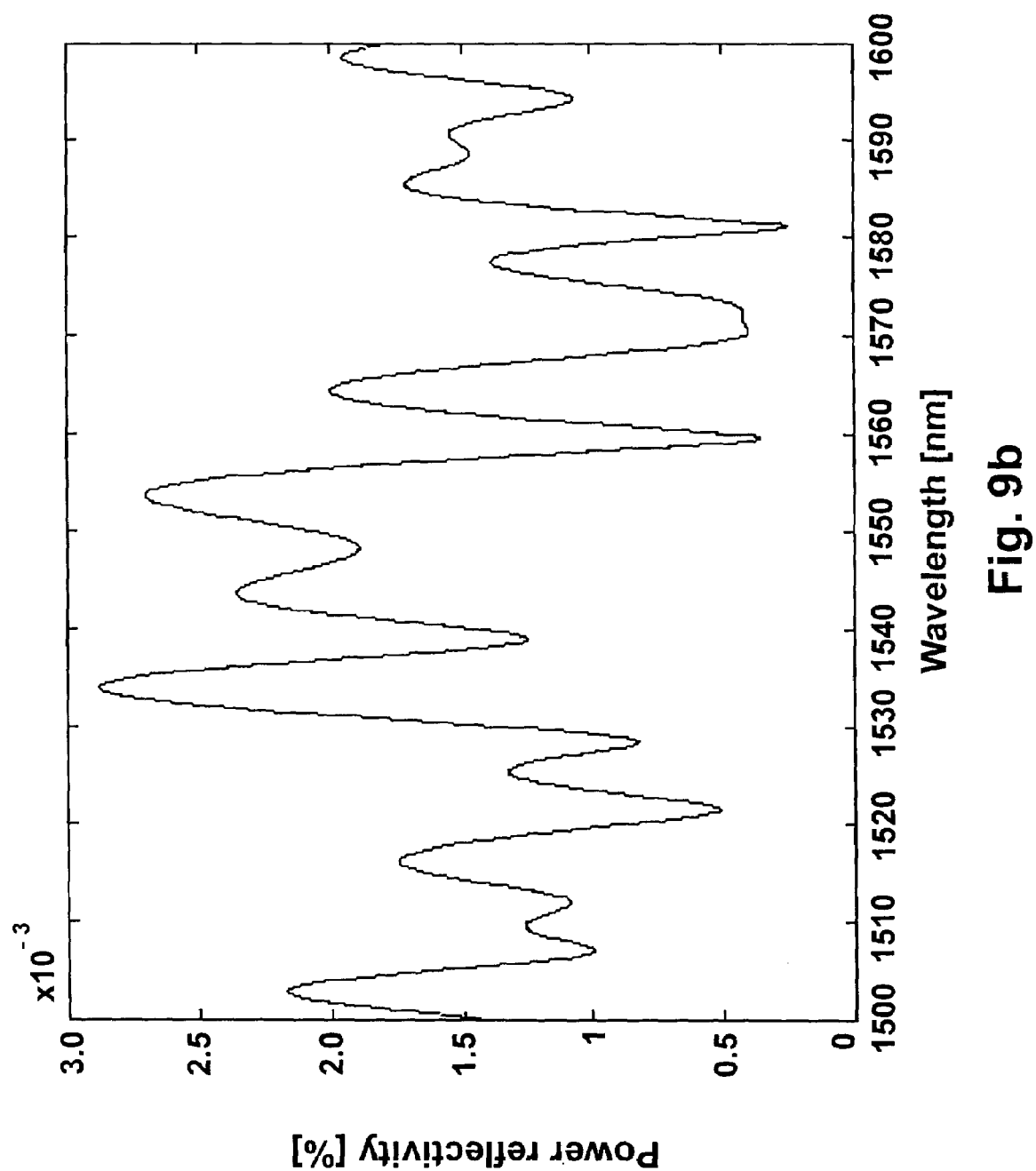
FIG. 9b shows a Power reflectivity of the arbitrary Swag of FIG. 8, obtained with home-made routines.

The graph of FIG. 9a has been obtained with the FIMMProp 3D software from PhotonDesign and the graph of FIG. 9b has been obtained with home-made numerical routines. This example validates the numerical routines for the case of an arbitrary Swag profile, so for the rest of the text, it will be acceptable to suppose that the home made numerical routines are sufficiently correct.

Coming back to the consequences of equation (3), it is known from digital filter theory that a very large number of spectral profiles for the light filtered by the reflection process can be obtained by properly adjusting the amplitudes and delays of the reflected light components. Several useful examples are given here below.

Numerical Examples

Numerical examples are detailed here to illustrate the theoretical description of the invention. In the cases where planar waveguides have been assumed, the transverse dimension is referred to by the word width. It is important to note that all the calculations are made for the TE polarized fundamental mode. Extension to TM modes is straightforward.

Interleaved Apodized Hi-Lo Individual Swag Gratings for Multiple Spectral Peaks

Figure 5:
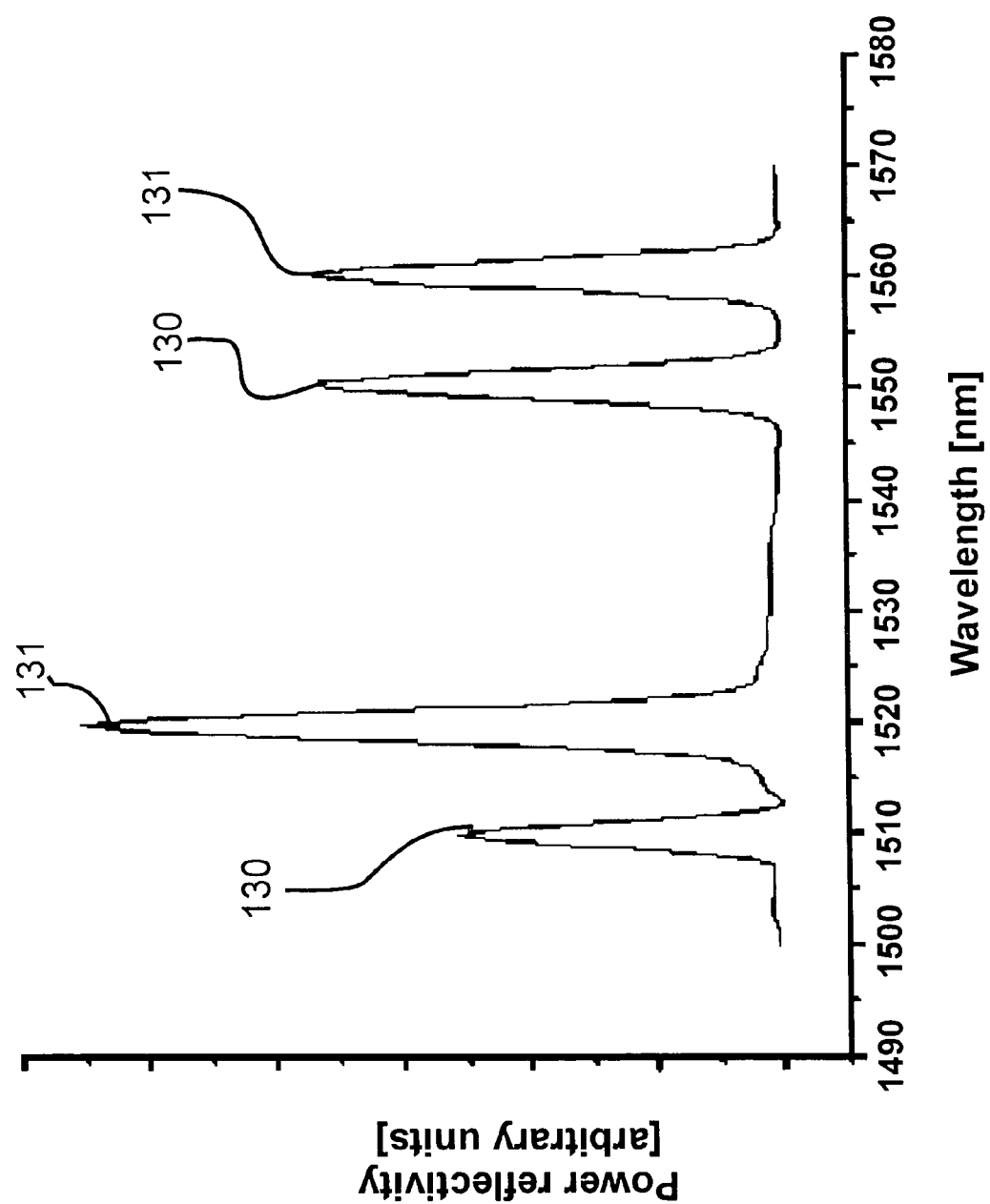
FIG. 5 shows a Power reflectivity of the interlaced Swags of FIG. 4.

The complete Swag filter shown in FIG. 4 is made up of two interleaved individual apodized Swag grating 107 and Swag grating 108 defines each subset of interfaces of the "hi-lo" type, to use an appellation familiar in dielectric filter design. For this example, the planar geometry have been used with a core index of 1.47 and a cladding index of 1.445. The spectral response in reflection is shown in FIG. 5 (one can see two peaks 130 reflected by the subset 107 and two more peaks 131 reflected by the subset 108). The individual Swag grating 107 has an optical path length of 81 quarter-wavelengths between consecutive interfaces for input light at 1550 nm, while the individual Swag grating 108 has an optical path length of 81 quarter-wavelengths between interfaces for input light at 1560 nm. The physical distances between the interfaces of Swag grating 107 are somewhat all different. They are: 20.0968 μm, 20.09754 μm, 20.09634 μm, 20.09816 μm, 20.09567 μm, 20.09891 μm, . . . The physical distances between the interfaces of Swag grating 108 are: 20.2268 μm, 20.22724 μm, . . . One can see that the interfaces are not strictly periodic in terms of physical distance. The exact position of each interface have been manually computed. Note that individual Swag 107 can be translated relative to 108 without much affecting the spectral response of each individual Swag grating, but again one must apply the prescriptions given above concerning the optical path lengths between interfaces of the same subset.

Figure 6:
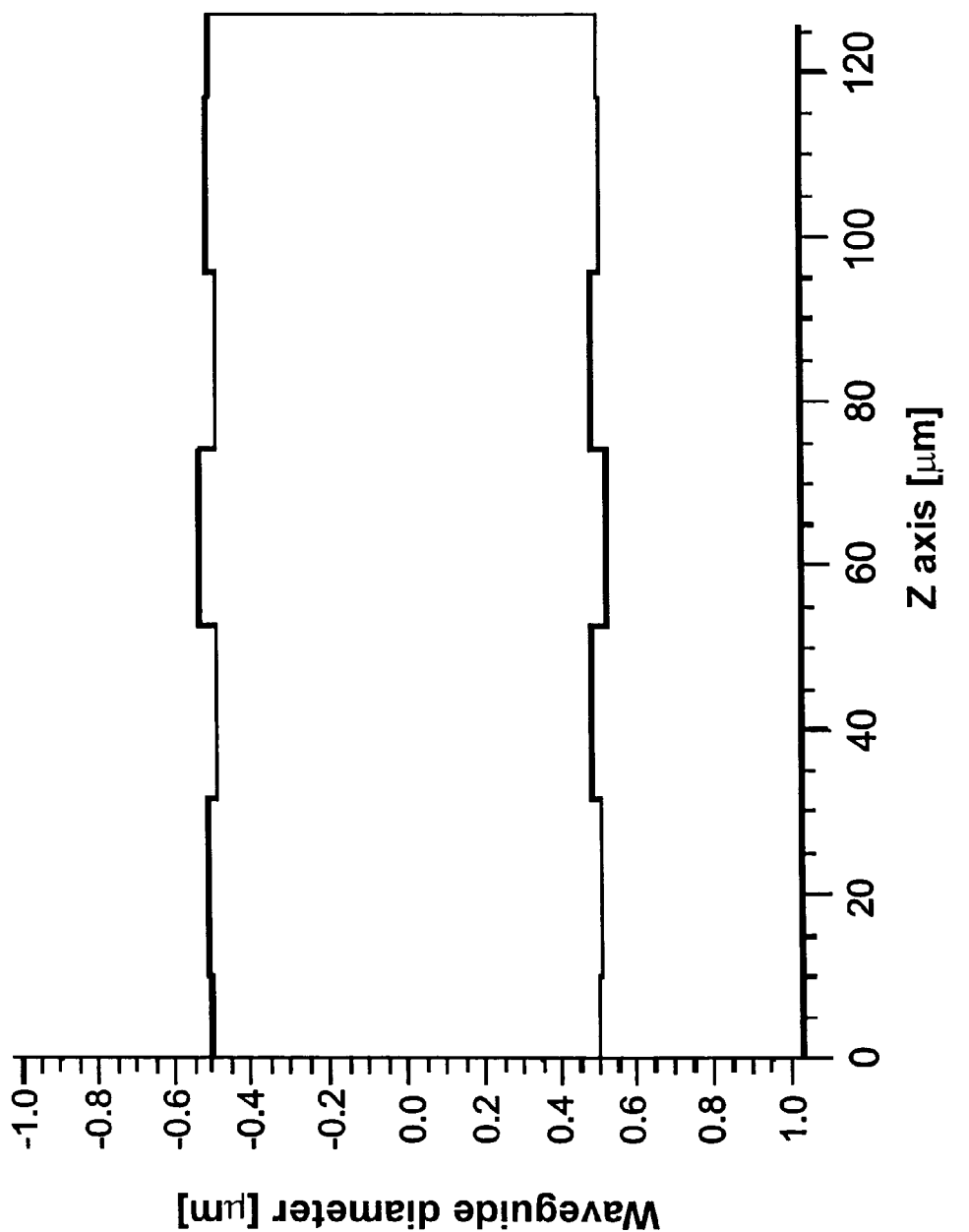
FIG. 6 shows a Apodized hi-lo cylindrical aluminosilicate/silicate waveguide-based Swag designed for a single set of wavelengths.
Figure 7:
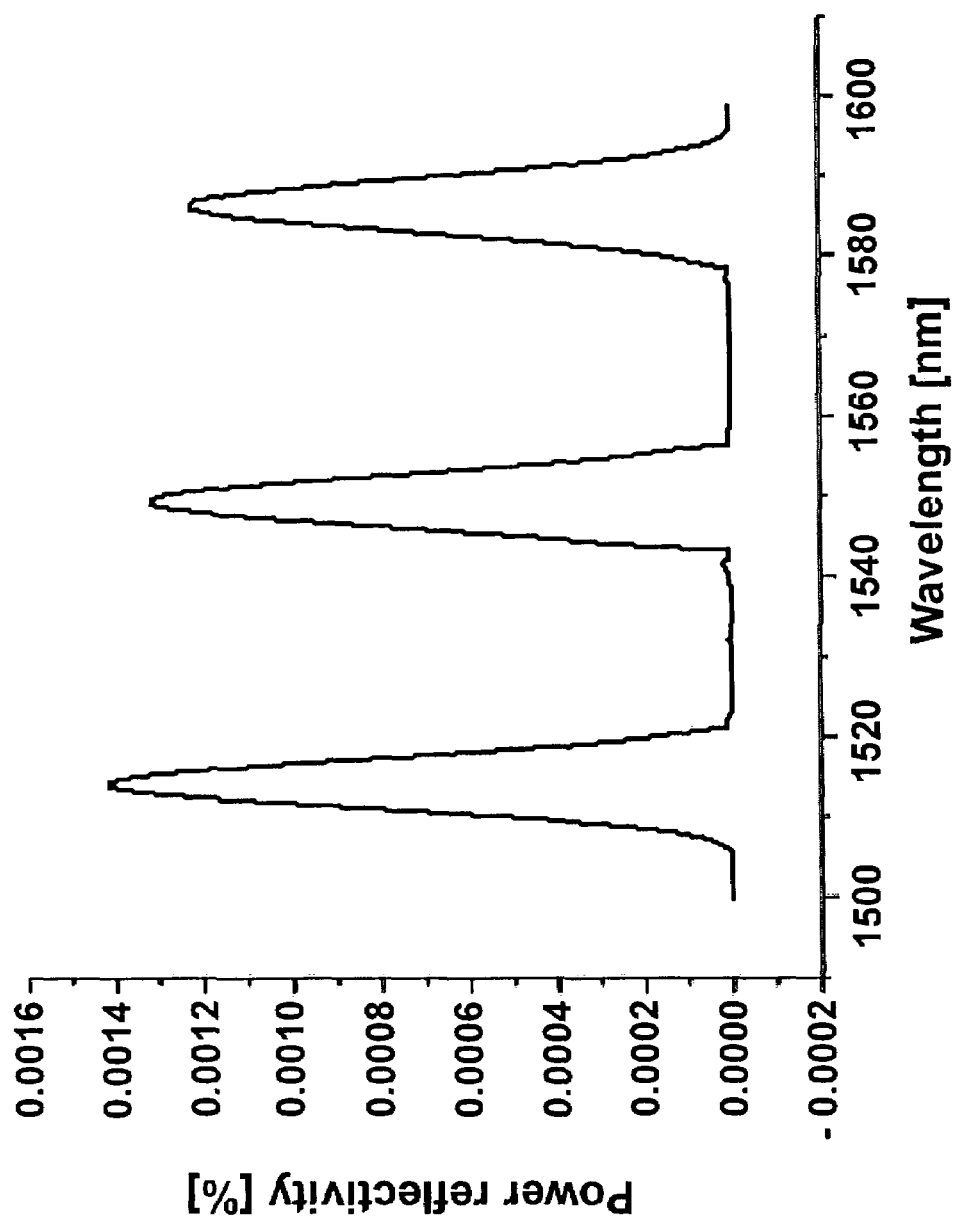
FIG. 7 shows a Power reflectivity of the individual Swag of FIG. 6.

FIG. 6 shows another individual Swag all by itself with its reflection spectrum shown in FIG. 7. In this case the segments are cylindrical aluminosilicate/silica waveguides. Note that even when an individual Swag grating is all alone the physical distances between interfaces are not strictly the same, in other words the interface pattern is not strictly periodic. This is especially true when the waveguide's core and cladding have a large difference in refractive index, which is the case for the aluminosilicate/silica material system. When two such hi-lo Swag gratings are interleaved all distances between interfaces change in such a way that the prescriptions described above are fulfilled regarding optical path lengths between interfaces belonging to a given subset.

Interleaved Swag Grating Filters for Multiple Spectral Peaks

Figure 10A:
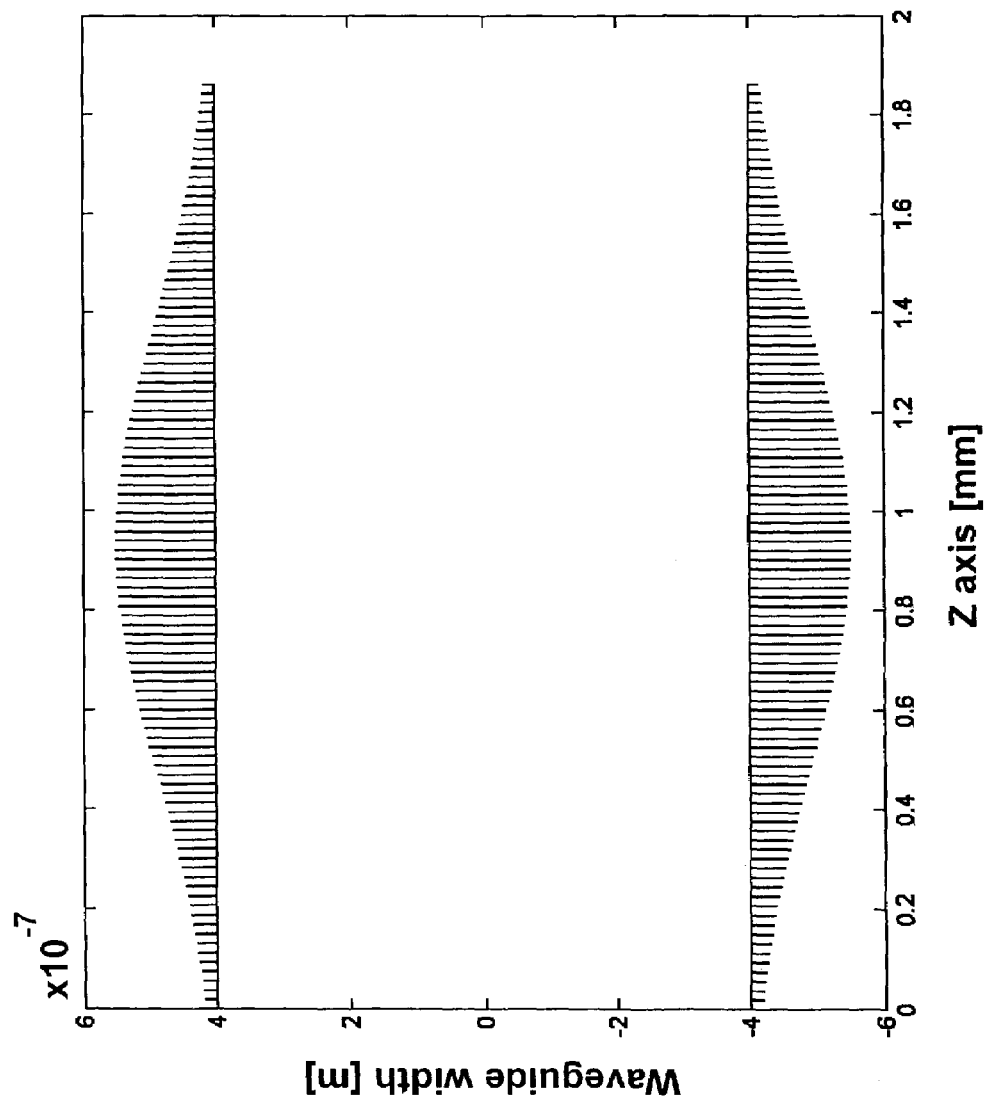
FIG. 10a shows a Individual Swag grating made up of quarter-wave stubs for single set of wavelengths (planar waveguide aluminosilicate/silica based)
Figure 10B:
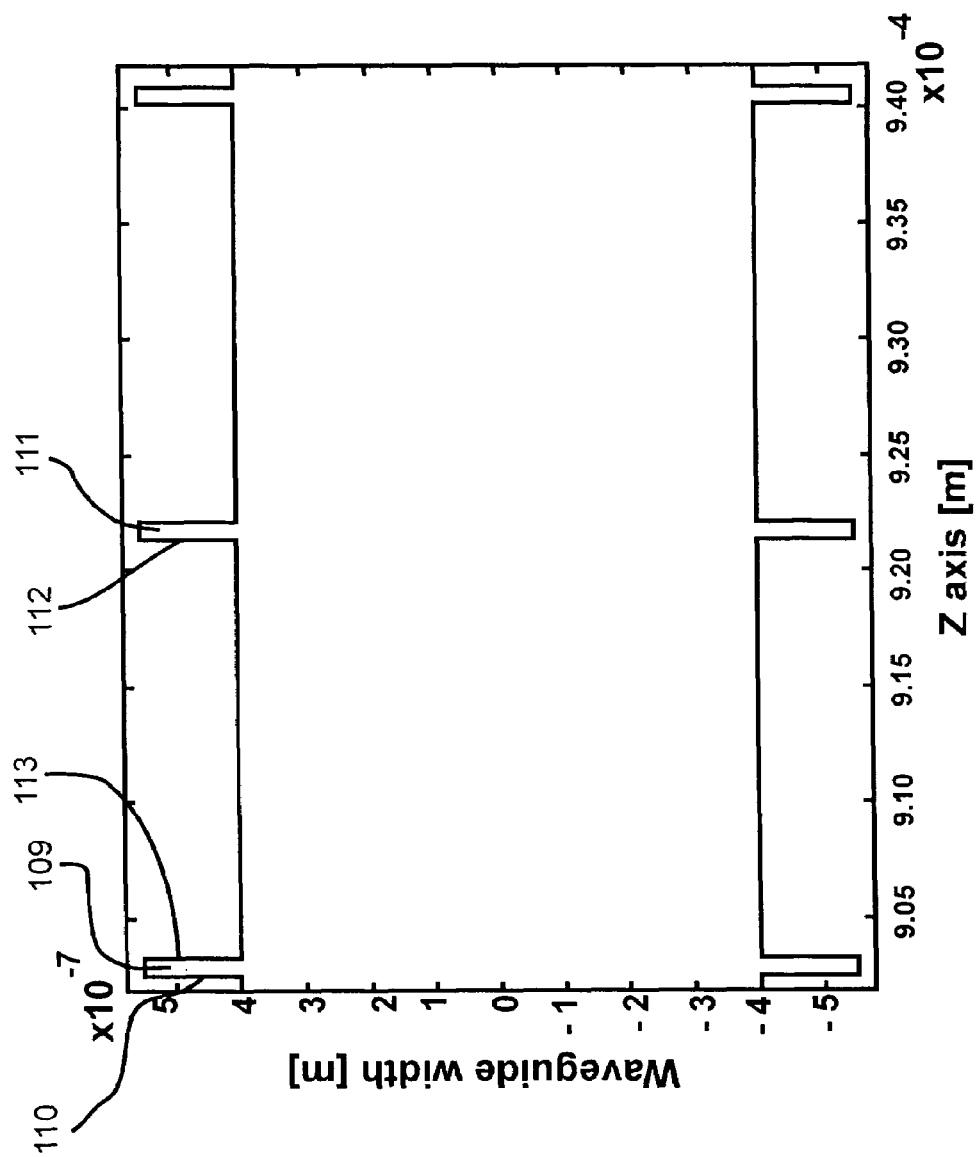
Figure 11A:
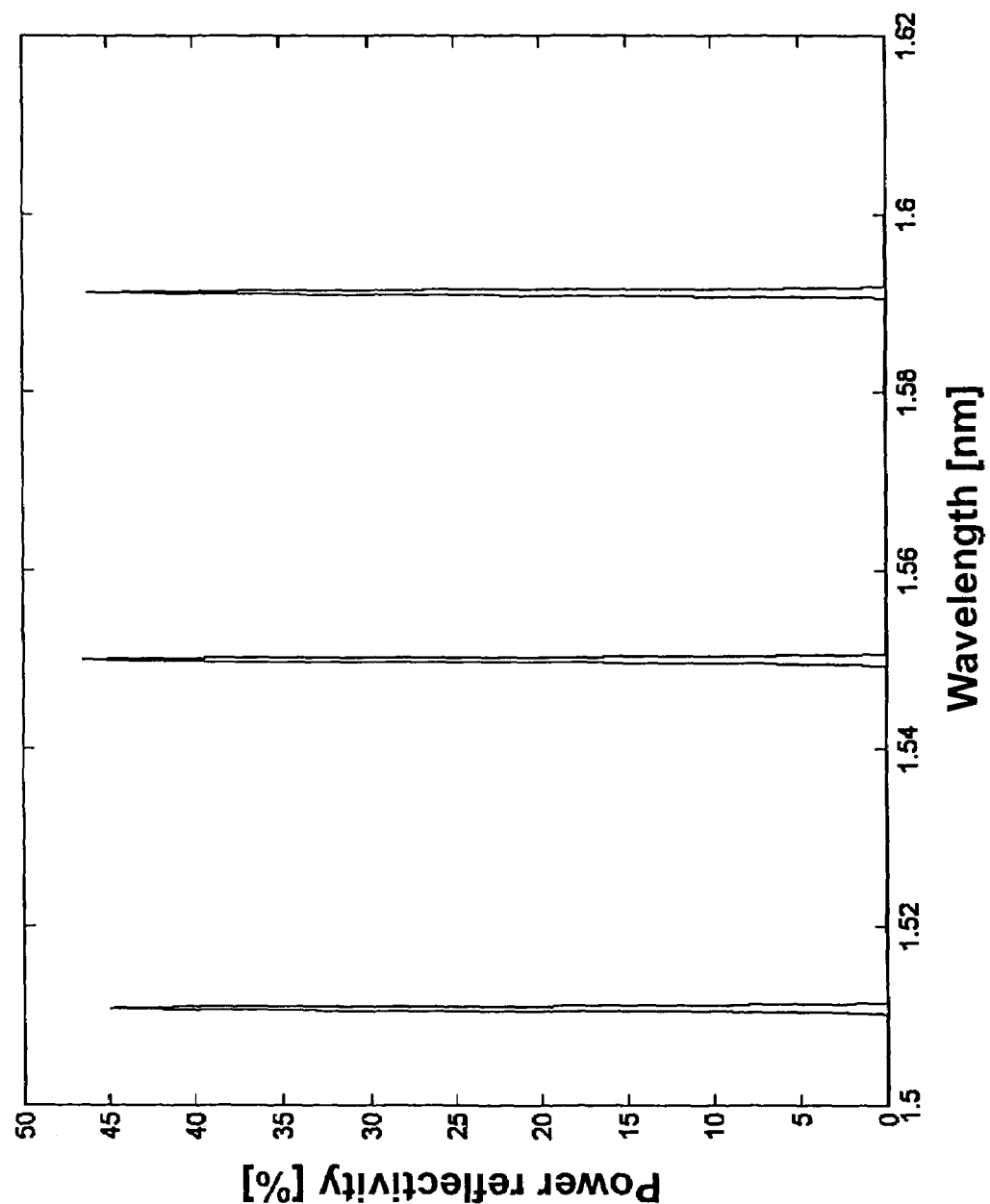
FIG. 11a shows a Power reflectivity of the quarter-wave stubs Swag of FIGS. 10a and 10b.
Figure 11B:
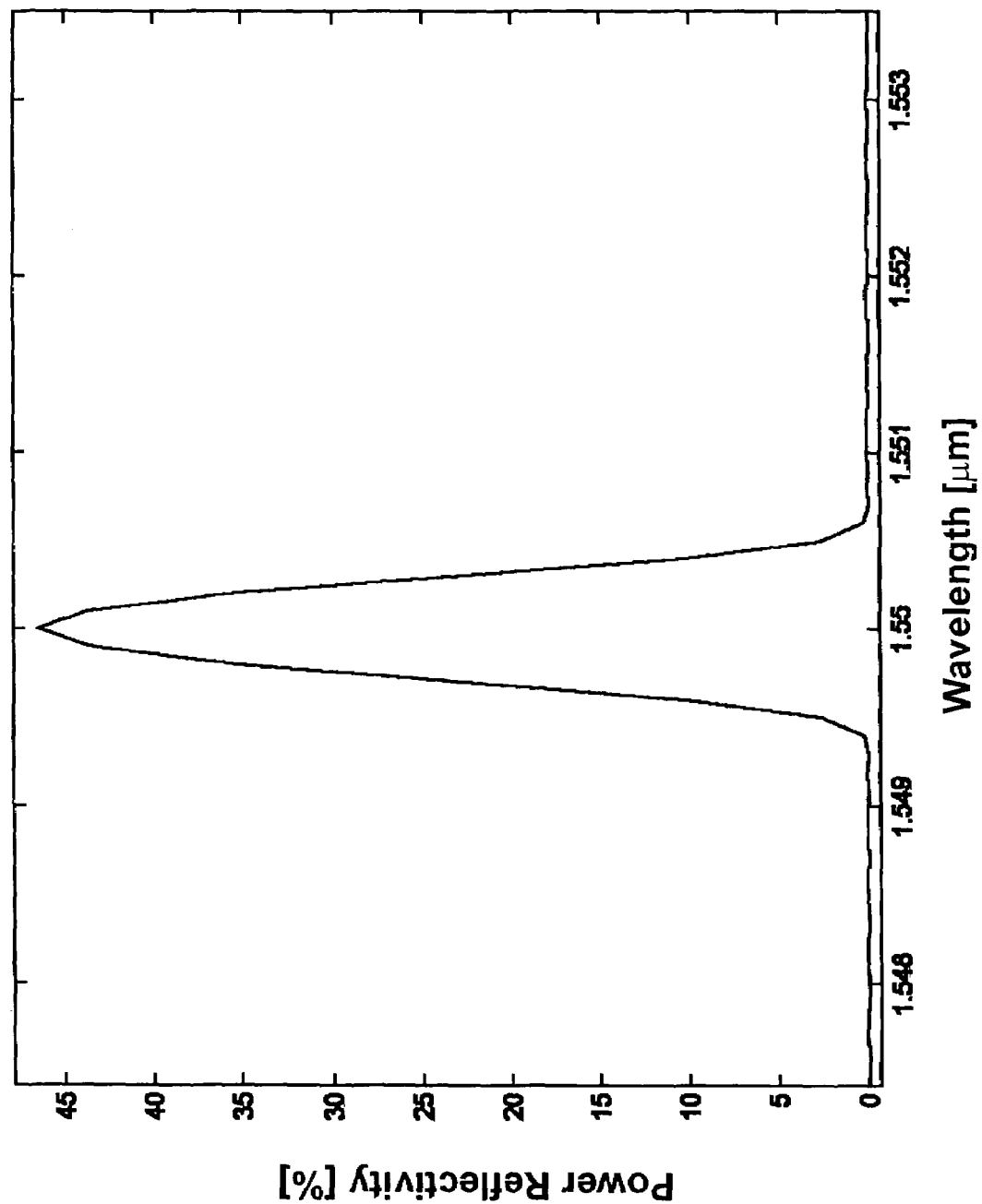
FIG. 11b shows a Zoom of the principal reflection peak of the power reflectivity of Swag of FIG. 10.

For some applications a filtering functionality which is desired is one presenting sharp peaks at certain prescribed wavelengths. FIG. 10a and FIG. 10b (zoom of part of FIG. 10a) show what is called an individual quarter-wave stub Swag grating which displays the power reflection spectrum shown in FIG. 11a and FIG. 11b. This Swag filter is designed to have a sharp reflection peak at 1550 nm and a free spectral range equivalent to about 40 nm in wavelength. This Swag filter comprises what is called an "apodized" array of N quarter-wave stubs forming the set of interfaces labeled $\{QWS_1, QWS_2, \ldots, QWS_n, \ldots, QWS_N\}$. The upstream (or left) interface $I_{n-1}$ 110 of stub $QWS_{n-1}$ 109 should be placed to the left of the upstream interface 112 of stub $QWS_n$ 111 by exactly 40 half-waves in optical path length, due care being taken to compute the latter precisely according to equations (1) and (2) by using waveguide computation software. The downstream interface 113 of stub $QWS_{n-1}$ 109 should be placed to the right of its upstream interface 110 by exactly one quarter wave in optical path length, again due care being taken to compute the latter precisely using waveguide computation software. By placing an optical circulator 100 or a directional coupler on the input side, this filter could be used in reflection as shown in FIG. 1 (the reflected light is denoted in FIG. 1 as "light out" from 103) in order to extract a single wavelength in the 1530–1565 nm C sub-band of erbium amplification in an optical communications system.

Figure 12A:
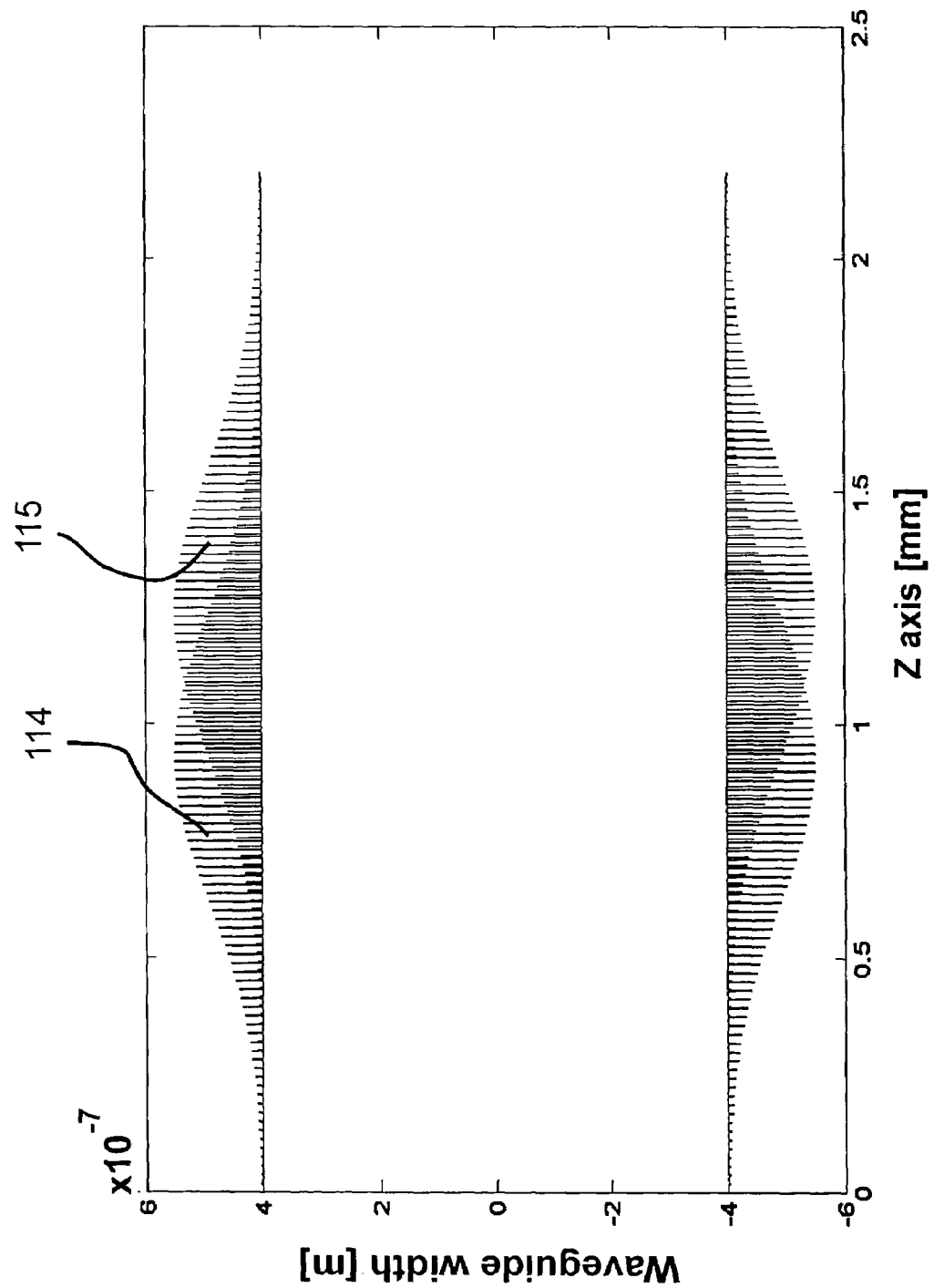
FIG. 12a shows a Lateral dimension along the X axis (core width) as a function of distance Z for two interlaced planar waveguide based apodized quarter-wave stub Swags.
Figure 12B:
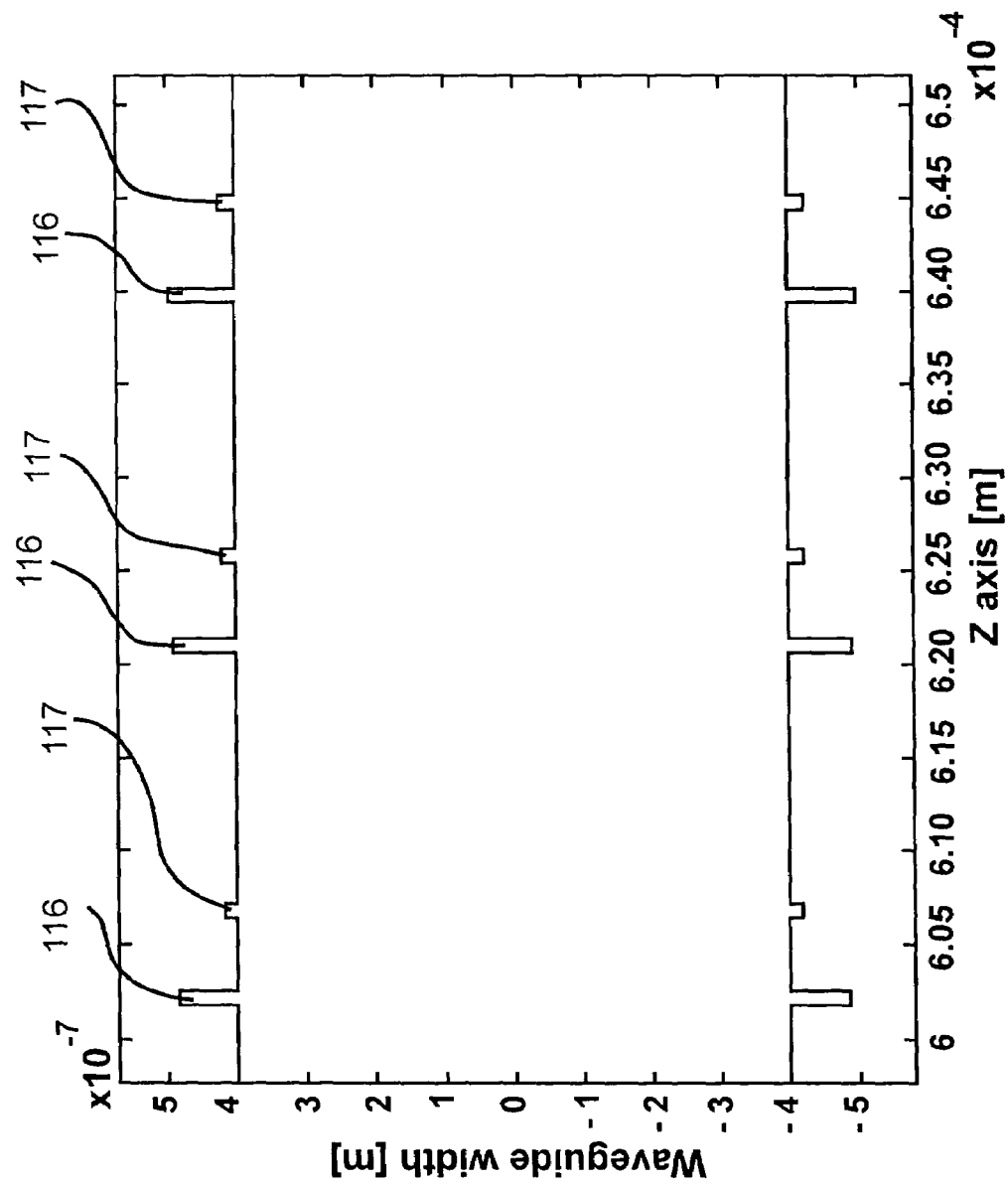
Figure 13:
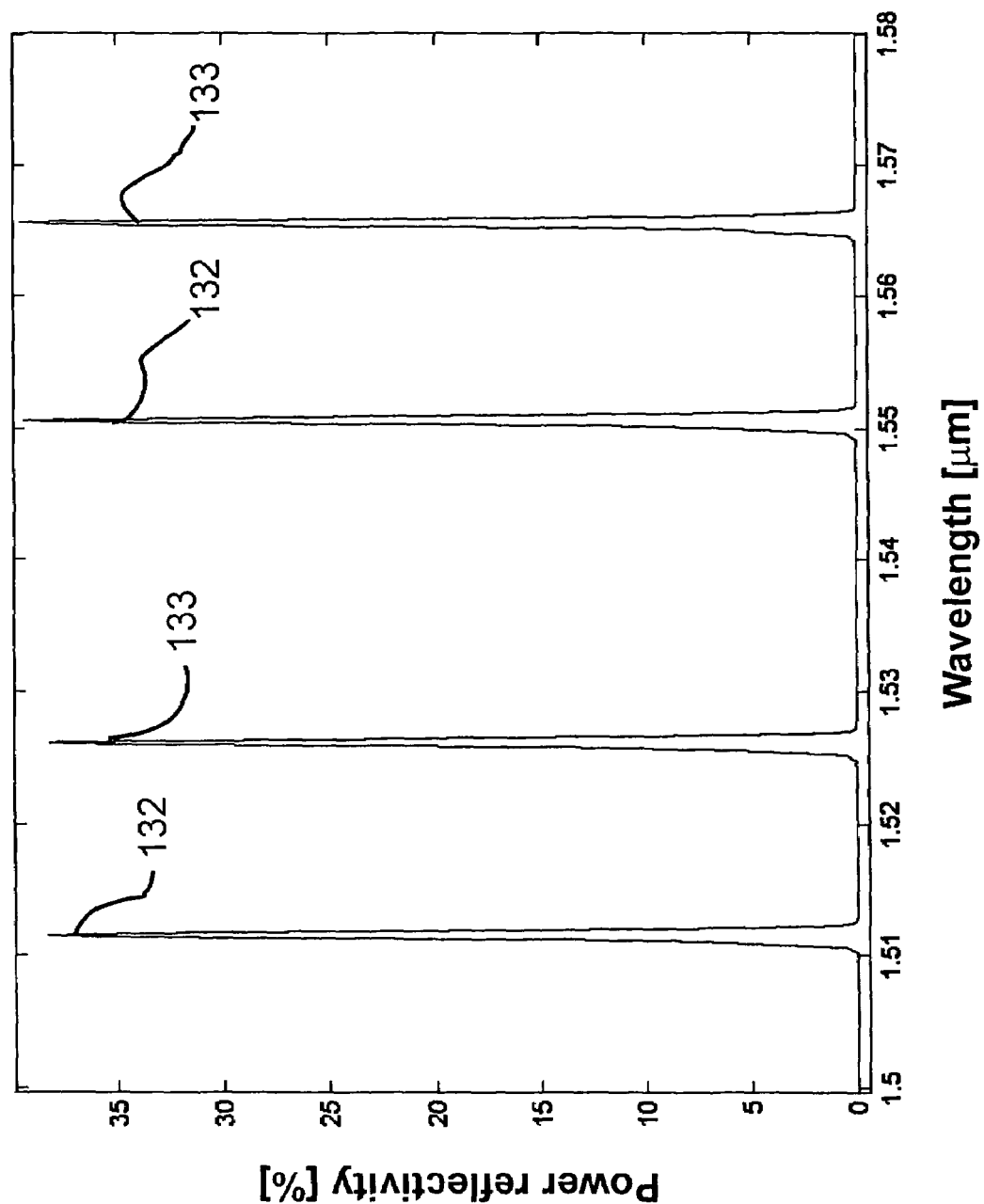
FIG. 13 shows a power reflectivity for the SWAG filter made up of two quarter-wave stub SWAG gratings of FIGS. 12a and 12b.

In FIG. 12a and FIG. 12b a Swag filter made up of two physically interleaved individual Swag gratings 114 and 115 is shown. This example is constructed from a planar aluminosilicate/silica waveguide with a median width of about 0.8 μm. FIG. 12a and FIG. 12b display the waveguide transverse dimension as a function of distance along the Z axis. The zooming of FIG. 12b shows some of the interleaved stubs, 116 constituting the individual Swag grating 115 and 117 constituting the individual Swag grating 115. Swag grating 114 has exactly 71 quarter-waves in optical path length between two consecutive stubs at wavelength 1550, while Swag grating 115 is also has exactly 71 quarter-waves in optical path length between two consecutive stubs at wavelength 1565 nm. The spectral response is shown in FIG. 13 (one can see two peaks 132 reflected by the subset 114 and two more peaks 133 reflected by the subset 115). As mentioned earlier, the exact position of each stub has to be adjusted while taking into account all the upstream stubs.

Interleaving Quarter-Wave Swag Gratings for the Same Wavelength

Figure 14A:
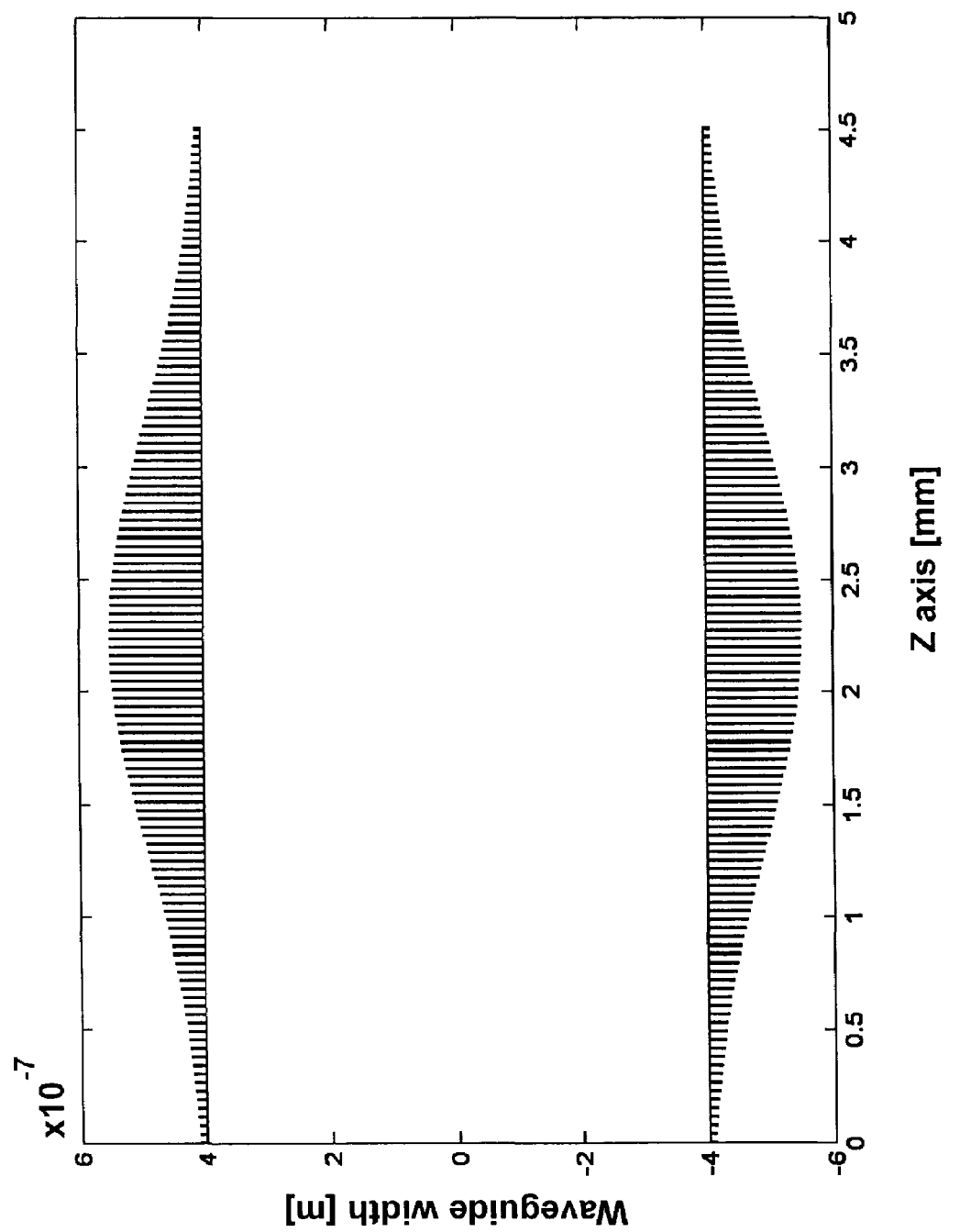
FIG. 14a shows a Two interleaved planar aluminosilicate/silica quarter-wave stub SWAGs with approximately the same free spectral range producing higher reflectivity peaks.
Figure 14B:
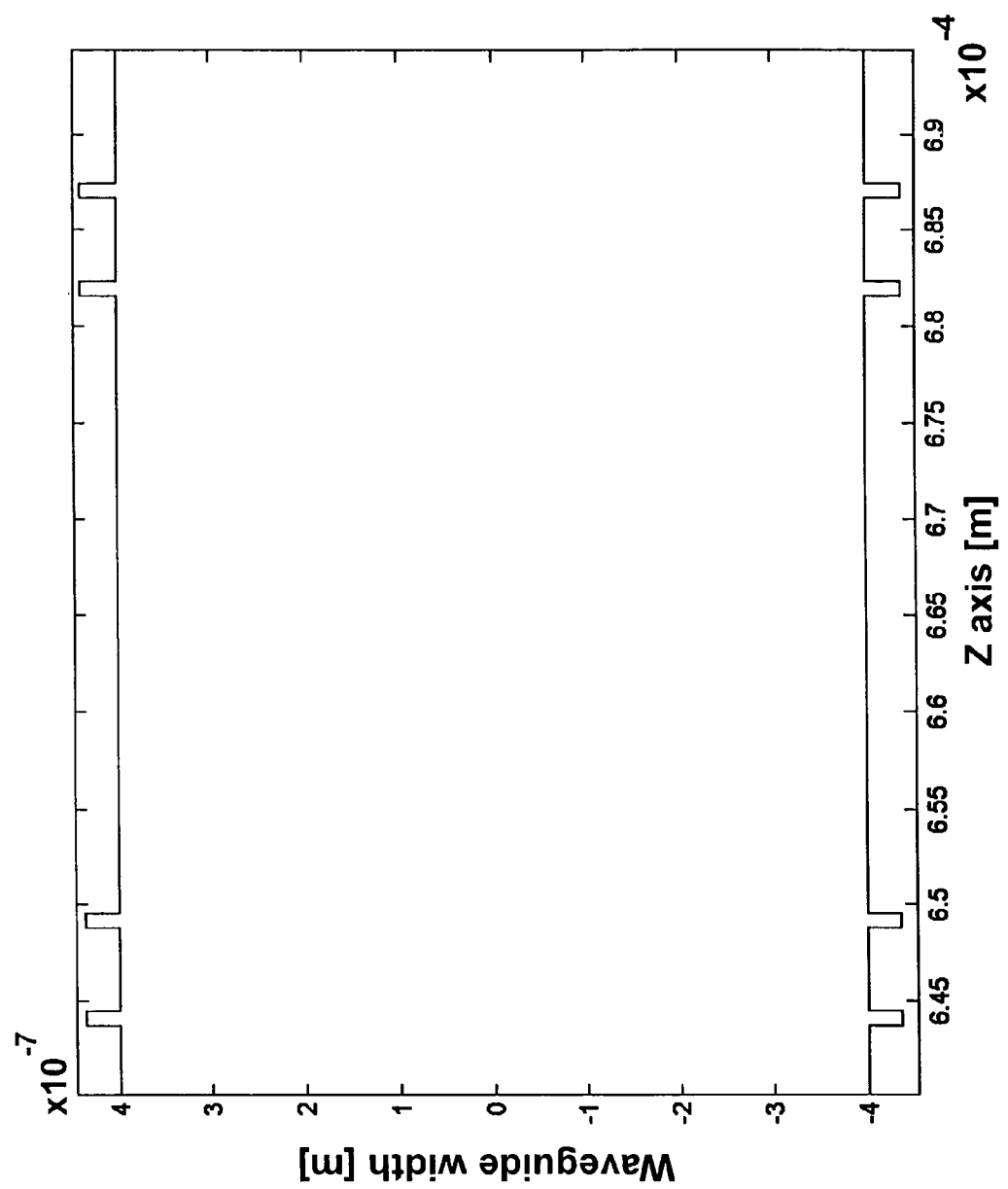
Figure 15:
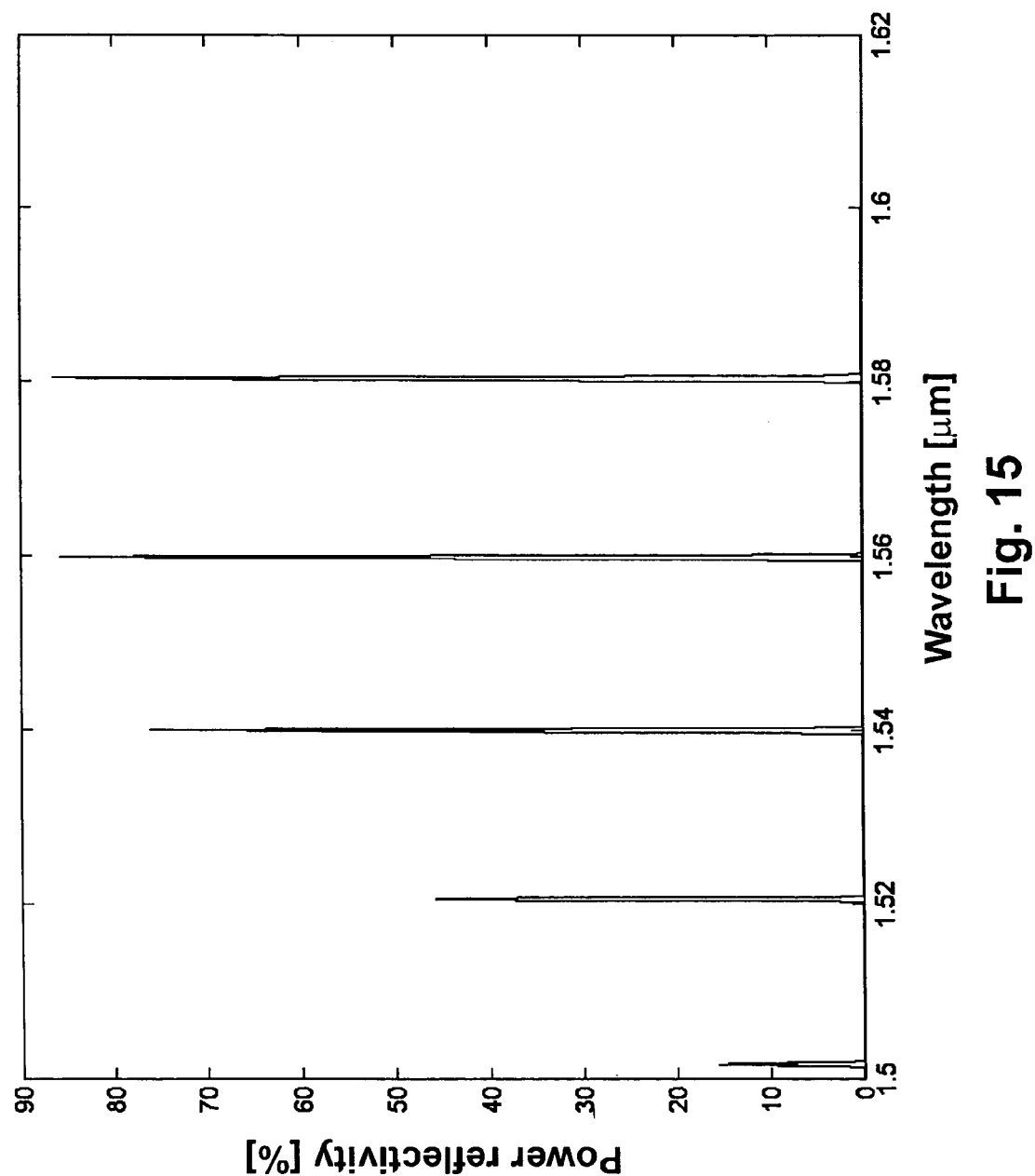
FIG. 15 shows a Power reflectivity for the SWAG filter made up of two quarter-wave stub SWAG gratings of FIGS. 14a and 14b.

It is also possible to interleave two quarter-wave Swag gratings which are designed to reflect the same wavelength but which are slightly different physically and displaced from each other. FIG. 14a and FIG. 14b display the width of the planar waveguide as a function of Z to achieve this functionality. This example is constructed from the same waveguide as the previous example. The spectral response is shown in FIG. 15. In this case the first quarter-wave stubs Swag grating is designed to reflect maximally at λ=1540 nm with a free spectral range of 20 nm, while the second quarter-wave stubs Swag grating is designed to reflect maximally at 1560 nm with a free spectral range of very nearly 20 nm too. At 1560 nm and at 1540 nm the electric field amplitudes of the light pulses reflected by the two interfere constructively so that the peak reflectivity is now about 2 times larger. With this approach, one could get almost 100% of power reflectivity for very sharp peaks from two short quarter-wave stub individual Swag gratings.

Rectangular Spectral Window

In the field of optical communications a useful filtering function is one in which the reflectivity is high and has a nearly flat top over a prescribed optical frequency range. For channels separated by 100 GHz in optical frequency, for example, one wishes to have a filter with a pass-band that has a nearly flat maximum over 60 GHz of bandwidth. This allows light pulses in 10–40 GB/s communications systems to suffer minimum distortion. Another need in multiwavelength communications systems is for a filtering function that gives a nearly flat top over a group of adjacent channels, so that one could drop off or add a group of channels into a fiber optic communications link.

Figure 16A:
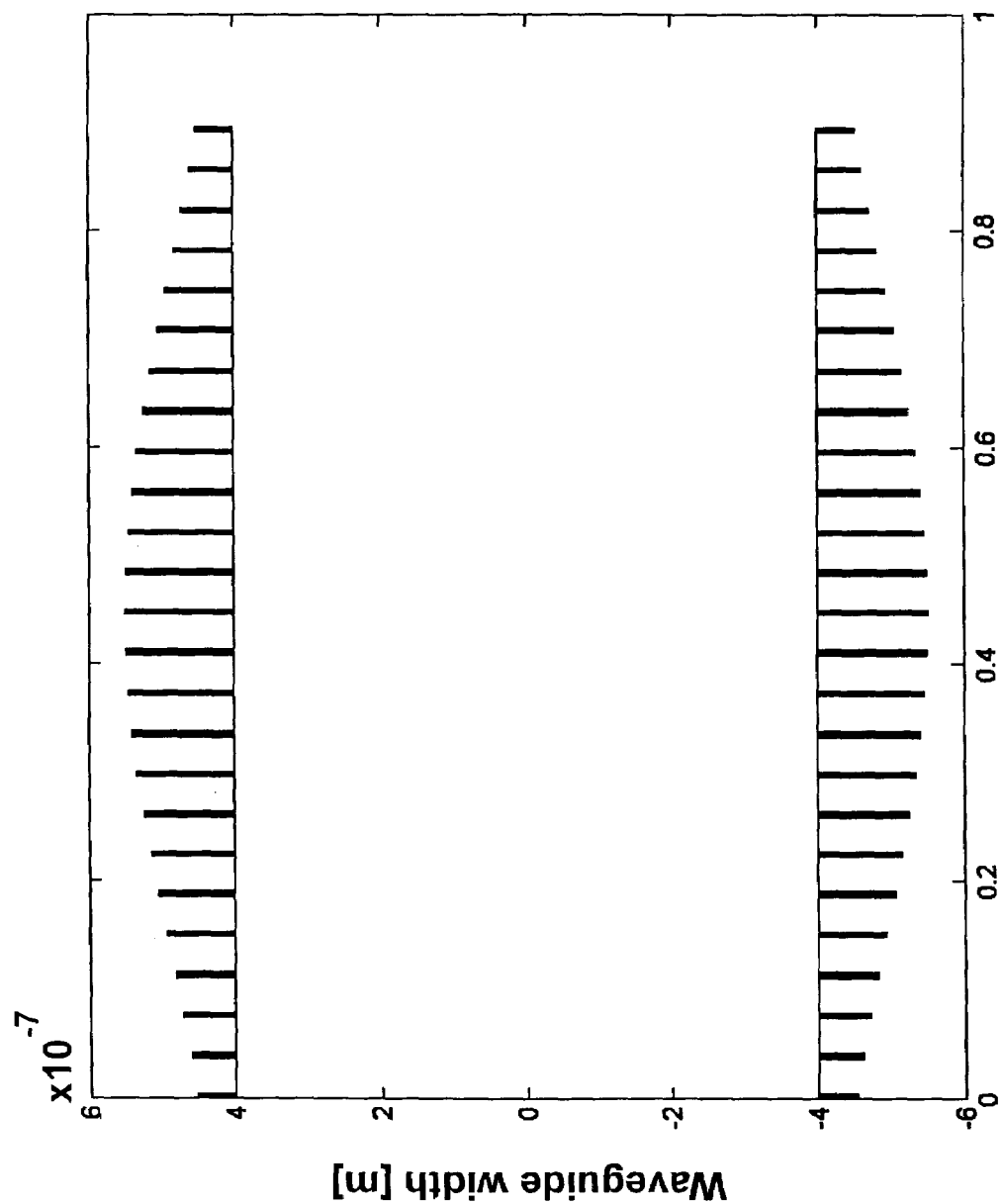
FIG. 16a shows a Three interleaved planar aluminosilicate/silica quarter-wave stub SWAGs producing a quasi rectangular reflection spectrum.
Figure 16B:
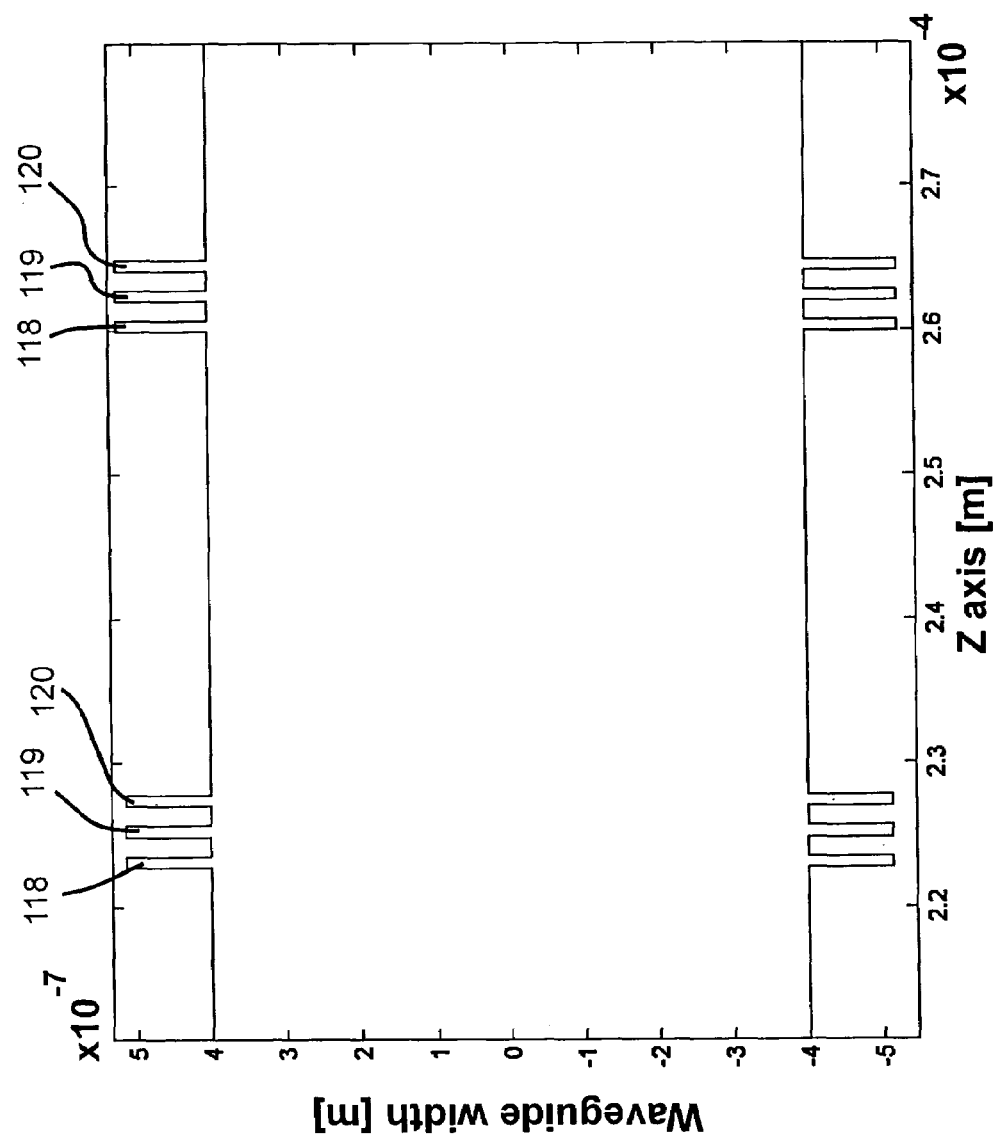
Figure 17A:
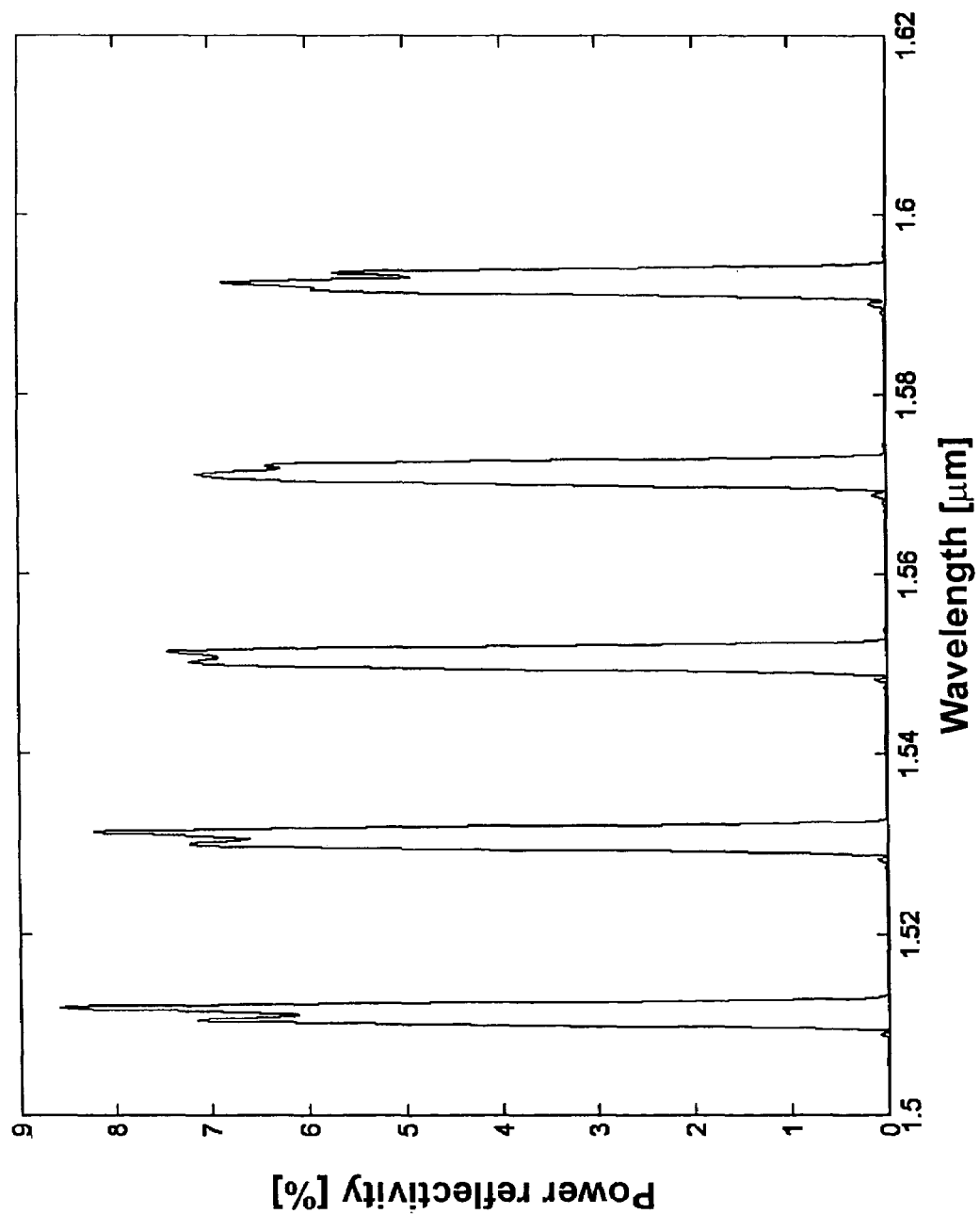
FIG. 17a shows a Power reflectivity for the SWAG filter of FIGS. 16a and 16b.

Two ways are given here for synthesizing a reflection profile that will produce such a rectangular window. In FIG. 16a and FIG. 16b three individual Swag gratings are interleaved, each one with a reflection peak at a slightly different wavelength, so that their spectral profiles add up and broaden the reflectivity peak into an approximately rectangular spectral response. The spectral response obtained is shown in FIG. 17a and FIG. 17b (zoom). One can see that an approximately flat top response is obtained over a 2-nm bandwidth 121 centered at 1551 nm. In order to get a spectral response that is closer to an ideal rectangular window, one could add several more individual Swag gratings and make them physically longer so that each one's individual response would be spectrally sharper, but their added aggregate reflectivity would be spectrally broader.

Figure 18A:
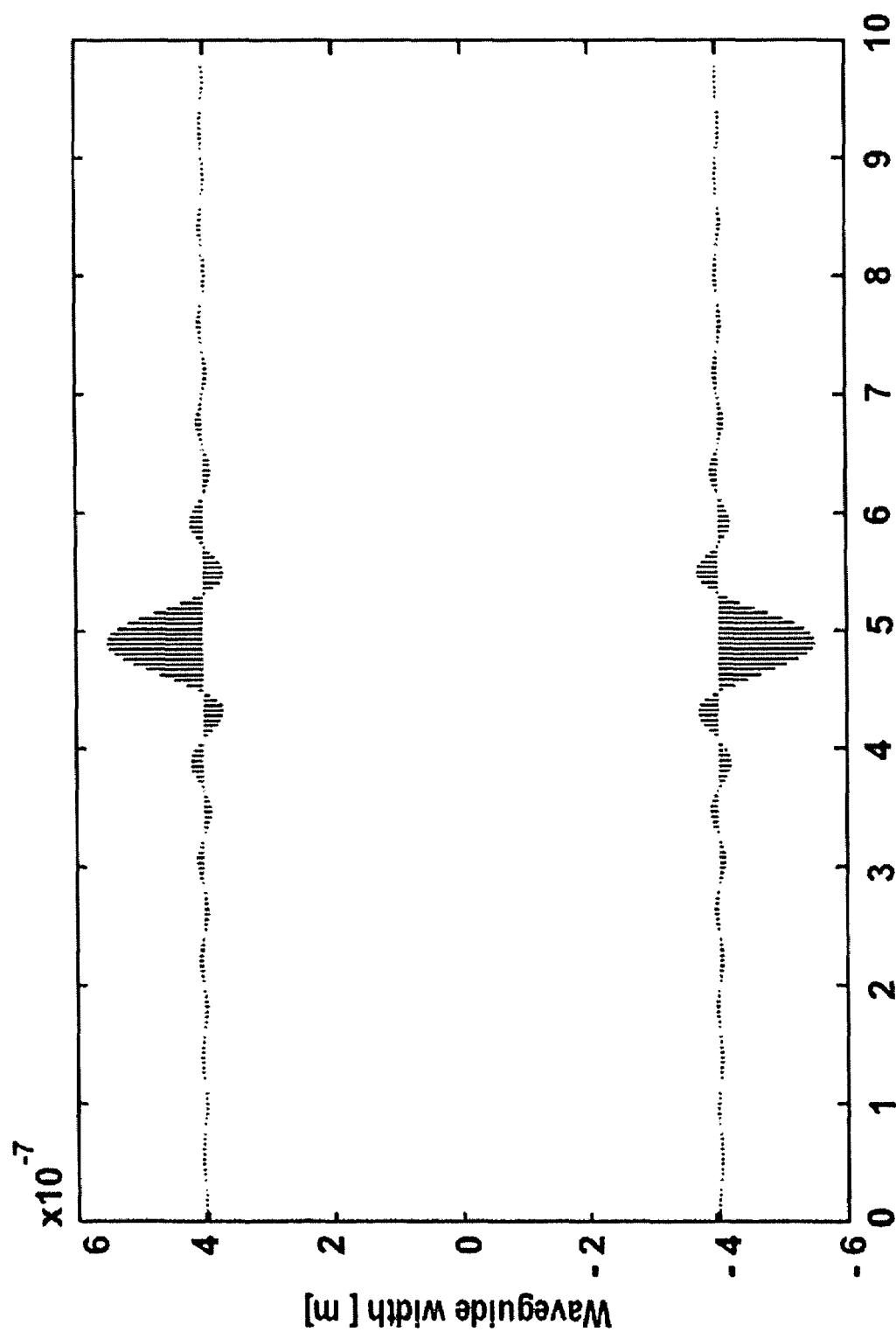
FIG. 18a shows a Planar waveguide based Swag grating whose envelope is a sinc(Z) function.
Figure 18B:
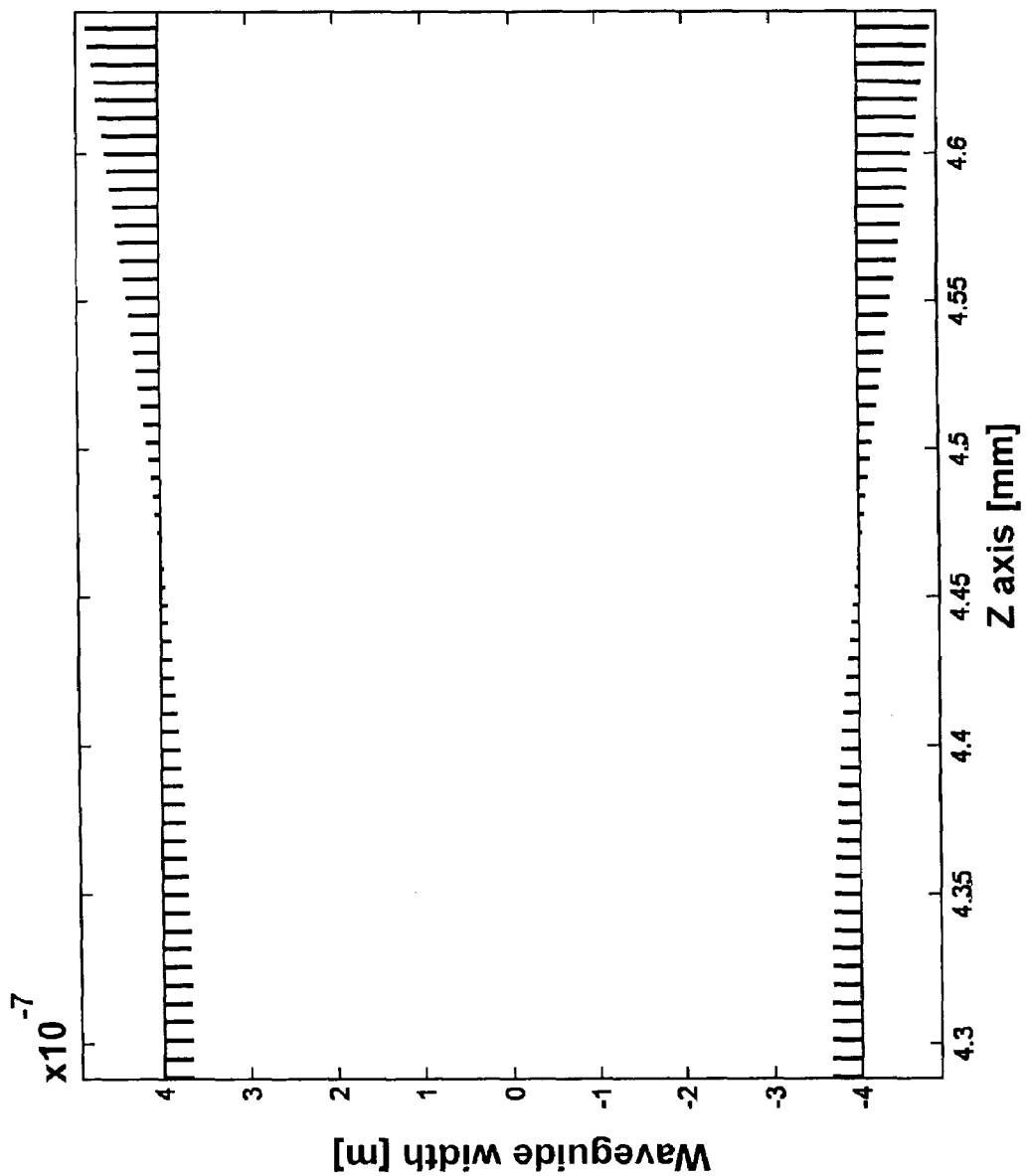
FIG. 18b shows a Zoom of a section of the planar waveguide-based Swag grating whose envelope is a sinc(Z) function.
Figure 18C:
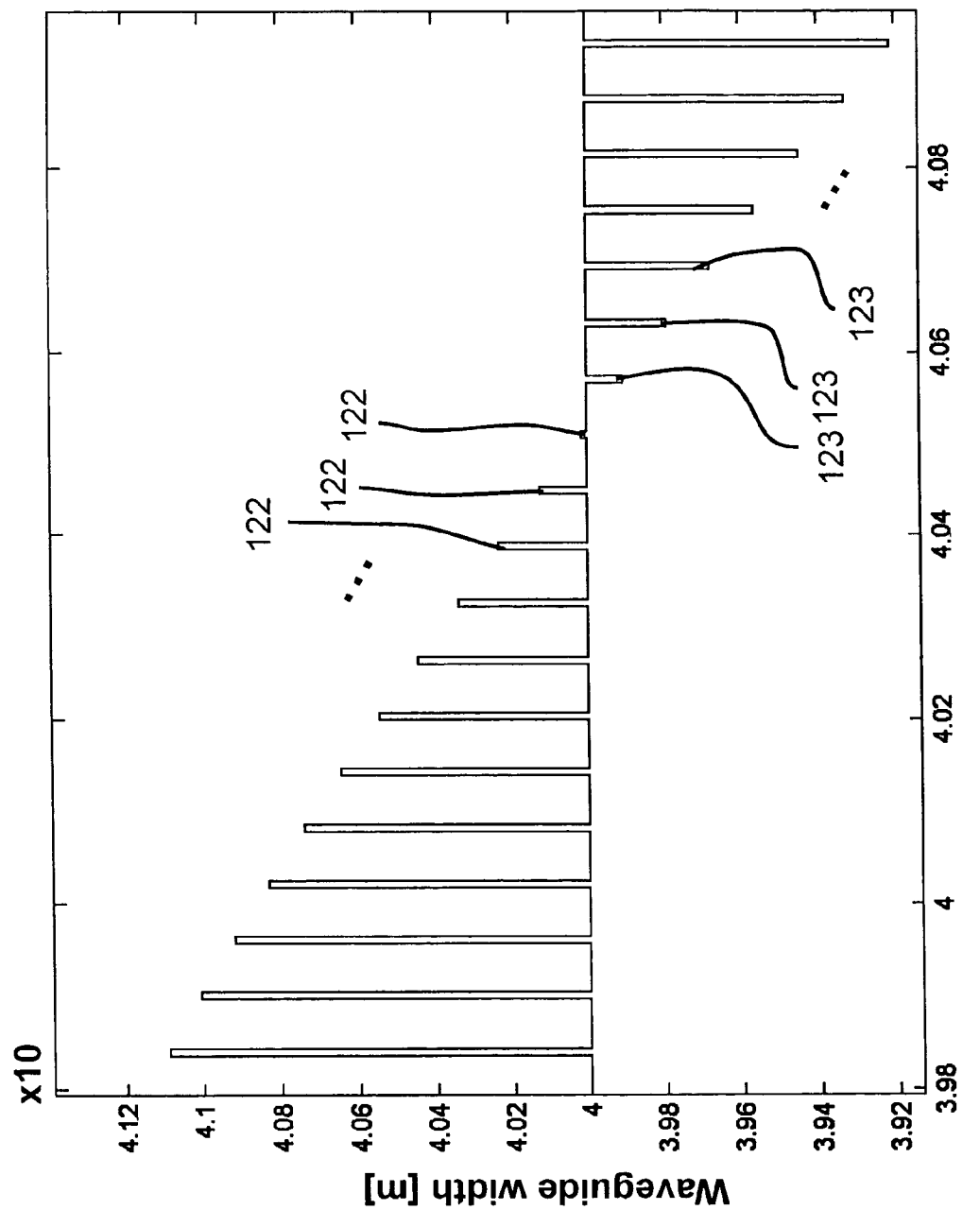
FIG. 18c shows a Zoom of a smaller section of the planar waveguide-based Swag grating whose envelope is a sinc(Z) function.
Figure 19:
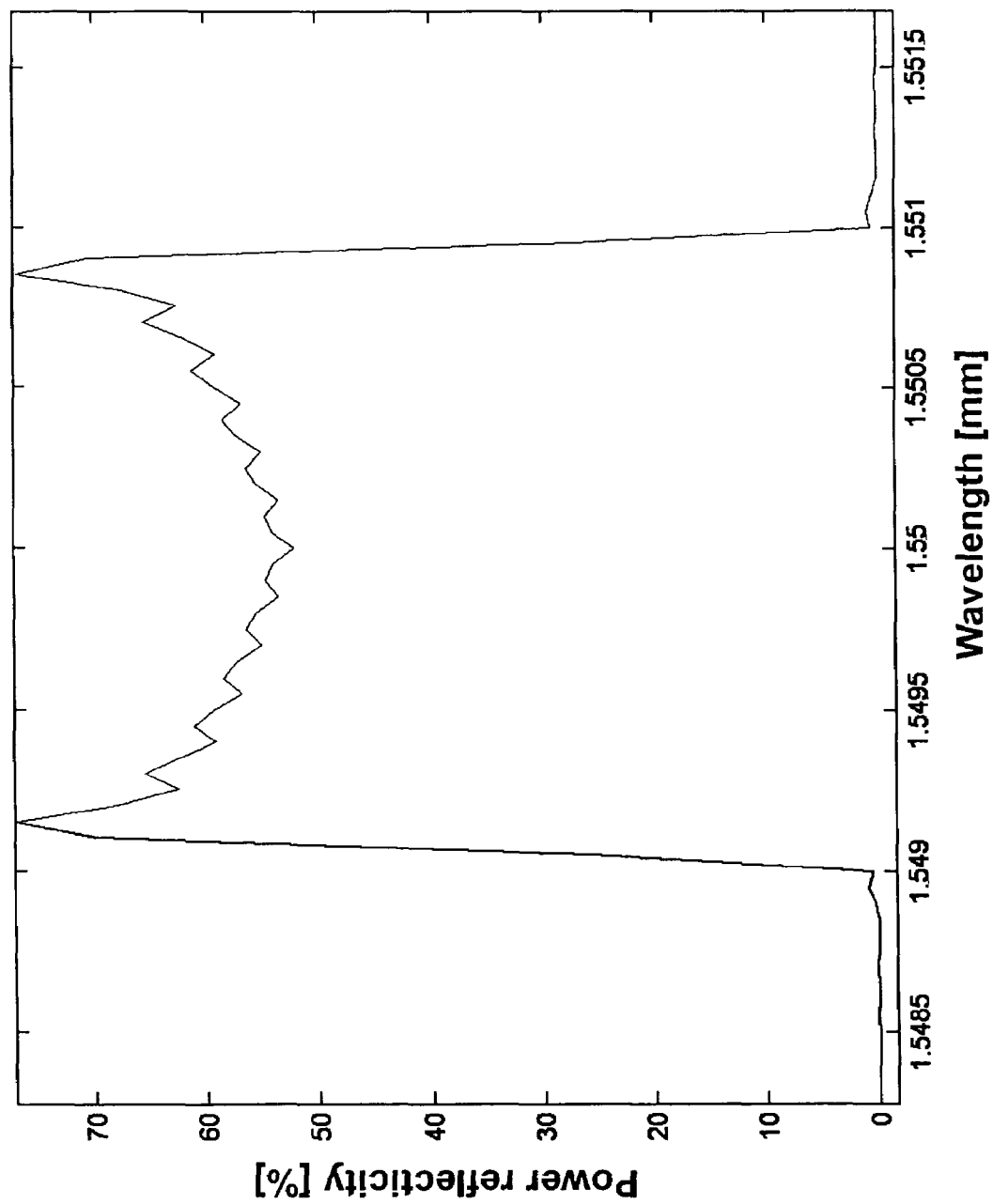
FIG. 19 shows a Spectral power reflectivity of Swag grating shown in FIGS. 18a, 18b and 18c. Such a rectangular response can be used to add or drop blocks of optical wavelengths.

Another attractive way of generating a rectangular window is to make a Swag grating patterned after the Fourier transform of a rectangular shape, that being the sinc function sin c(x)=sin x/x, as illustrated in FIG. 18a, FIG. 18b and FIG. 18c. One can see from the zooming of FIG. 18b and FIG. 18c that the variations of the transverse dimension of the base waveguide goes from positive 122 to negative 123 and create stubs and notches. The space between each pair of stubs and notches is 5.377 μm which leads to a large free spectral range (approximately 20 THz) so it is of no interest to show the repetition of the rectangular window along the wavelength axis. FIG. 19 shows that in the vicinity of the 1.47-micron wavelength chosen for this example, a nearly flat top response is obtained, and that very fast rising "walls" are obtained for the rectangular window. The nearly flat top extends over 20 nm of bandwidth and the walls have a 10–90% rise of about 1.5 nm.

Manufacturing the Swag Filters

Modern techniques of nanolithography using electron beams, extreme ultraviolet laser light, and X-rays, can be used to fabricate the segmented waveguides described here. All these techniques are capable of spatial resolutions well under 100 nm, reaching down in fact to a few nanometers in the case of electron beams. UV lasers, X-rays and electron beams typically write a pattern into a photoresist. Chemical development results in a hole and mesa pattern in solid baked photoresist. This pattern can be transferred into aluminosilicate and silica by means of reactive ion etching, as an example. A variety of direct laser beam controlled processes, such as direct ablation with femtosecond UV laser pulses, can also be used to pattern aluminosilicate and silica. The above fabrication processes are principally applicable to in-plane waveguides of rectangular cross-section as are currently found in integrated optics circuits. For cylindrical segments the approach described in the accompanying optical archival memory application would offer advantages. In this approach each segment would be engraved in each one of a large number of superimposed glass layers. The diameter of a focused laser beam rastered over a photoresist layer would determine the segment's diameter. The pattern would then be transferred into the glass through reactive ion etching.

The pattern could also be manufactured by imprinting or micro-embossing. The necessary dimensional changes would be imprinted on the waveguide.

Nanofabrication Precision Required

Given that the techniques mentioned above are vigorously being pushed towards sub-100-nm resolution, the question now arises as to what precision is required in order to obtain the maximum performance from Swag filters. A few details are given here below touching this topic.

Precision in $Z_n$

In order to obtain reflection peaks at precisely the desired wavelengths, the waveguide segments have to be precisely dimensioned to an accuracy in the nanometer range. This nanometer precision holds for all three waveguide dimensions, X, Y and Z. Let us look at the effect of a systematic error δZ such that the optical path length between all interfaces in subset 107 in FIG. 4 is D+δZ instead of D. The free spectral range will be c/(D+δZ) instead of c/D, with the net effect that a given peak at wavelength λ in the reflection spectrum will be displaced by λ×δZ/D. As a numerical example for D=20 μm, λ=1550 nm, and a systematic error of δZ=+2 nm, a given reflection peak will be displaced towards longer wavelengths by $10^{-4}$×1550 nm=0.15 nm. In terms of optical frequencies this means a shift towards lower frequencies by 19 GHz, which is a significant error for current channel spacings of 50 or 100 GHz.

It is clear from this that the optical path lengths between interfaces should be assured with nanometer-range precision in order to get 10-Ghz range precision in the position of spectral peaks in the SWAG reflection profile.

The optical path lengths between interfaces depend not only on the geometrical lengths of the waveguide segments but also on the effective index $n_{eff}$ seen by the mode propagating down the waveguide. FIG. 3 illustrates the variation of $n_{eff}(Z)$ with dimension $X_n$ for a waveguide of planar cross-section. The effective index $n_{eff}$ for the fundamental mode increases monotonically with the waveguide's transverse dimension $X_{in}$. Thus $n_{eff}$ can be modulated along the Z axis by choosing the values the transverse dimensions which give the $n_{eff}(Z)$ profile required by the filtering functionality sought for.

Precision in the Lateral Dimensions ($X_n$ and $Y_n$ or $R_n$)

For the aluminosilicate core/silica cladding material system the effective index changes by $\Delta n_{eff}=0.008832$ in going from a lateral dimension of 700 nm to 800 nm. For a 20-micron long segment this means an optical path length change of 176 nm, which according to the calculation above is quite significant. Again the precision required for the lateral dimension is on the order of 1 nm if one is to achieve optical path lengths defined along the propagation axis z with nanometer precision.

Designing SWAG Filters with the Transfer Matrix Approach

It can safely be assumed that several theoretical approaches are possible for designing SWAG filters. The well-known transfer matrix approach has been chosen. A big advantage offered by this technique is that one can impose a desired spectral response in both transmission and reflection and then work out the SWAG filter parameters. How to design a SWAG with the transfer matrix approach will be shown to amount to evaluating through iteration a sum of complex exponentials calculated from a number of points defining the desired spectral response.

Points to Consider in the Design

A few points need to be considered in the design of a SWAG filter:

Interface loss. The optical mode discontinuities at the SWAG interfaces cause a small scattering loss into unguided modes. This loss can be minimized by working in a range of waveguide core sizes where the lowest order mode diameter goes through a minimum, as illustrated in FIGS. 3 and 4. As an example, for the case of an aluminosilicate planar waveguide-based core of refractive index 1.6 at 1550 nm sandwiched by pure silica layers of refractive index 1.444, the core width range extends from 0.7 to 1.1 microns. For a cylindrical core (as in optical fibers) the core diameter range extends from 0.9 to 1.2 microns, as previously mentioned. The use of larger ranges for the core size would permit larger reflection coefficients at each interface but it would also lead to larger losses. To minimize these losses the core size range is restricted so that the mode diameter increases by at most 5% over its minimum value. Operating in this minimum mode size range is very important for the purpose of obtaining the desired spectral properties.

Another important consideration is the number of segments. The aluminosilicate/silica core/cladding combination gives an amplitude reflection coefficient r at the interface which typically ranges from −0.01 to +0.01. On the other hand the germanium-doped silica/silica core/cladding combination gives a reflection coefficient ranging from $-10^{-4}$ to $+10^{-4}$. It's clear that a much smaller number of segments will be required in the SWAG filter design for the aluminosilicate/silica case, which is one of these preferred embodiments. In an implementation with crystalline silicon as core (refractive index about 3.45 at 1550) and silica as cladding the $\Delta n$ nearly equal to 2 would also lead to large reflection coefficients r at segment interfaces.

Overview of the Transfer Matrix Method

The transfer matrix approach assigns a matrix to each propagation event through a segment and to each reflection/transmission event at the interface between segments. These matrices are written here below with reference to FIG. 1.

At an interface $I_n$ 125 between segments a reflection/transmission event occurs because the waveguide transverse dimensions abruptly change. The nth interface matrix is given by:

$$I_n = \frac{1}{t_n}\begin{bmatrix} 1 & r_n \\ r_n & 1 \end{bmatrix}, \tag{4}$$

where $r_n$ is the complex amplitude reflection coefficient caused by the change in the lowest-order mode's effective index $n_{eff}$ (see eq. 3) and where $t_n$ is the resulting transmission complex amplitude given by the equation $$t_n = \sqrt{1-r_n^2}.$$

As regards the propagation event matrices, they are given by:

$$P_n = \begin{bmatrix} e^{i\beta_n z_n} & 0 \\ 0 & e^{-i\beta_n z_n} \end{bmatrix}, \tag{5}$$

where $\beta_n$ is the mode's propagation constant and is given by equation 1 and $Z_n$ is the length of the nth segment.

With these matrices a sequence of segments and interfaces can be represented by simply multiplying all the relevant matrices as follows:

$$S = I_{N+1} P_N I_N P_{N-1} I_{N-1} \ldots P_3 I_3 P_2 I_2 P_1 I_1. \tag{6}$$

Where N is the number of segments.

When the matrix S for the entire system is known as a function of wavelength one can obtain the system's spectral response $t_{sys}$ in transmission and its spectral response $r_{sys}$ in reflection. These complex amplitude transmission and reflection coefficients are given by:

$$t_{sys} = \frac{1}{S_{11}}, \tag{7a}$$

$$r_{sys} = \frac{S_{21}}{S_{11}} = (1-t_{sys}^2)^{\frac{1}{2}} = \left(1-\frac{1}{S_{11}^2}\right)^{\frac{1}{2}}, \tag{7b}$$

Equations 7a and 7b can be rewritten as follow:

$$S_{11}(\lambda) = \frac{1}{t_{sys}(\lambda)} = \frac{1}{\sqrt{1 - r_{sys}(\lambda)^2}}. \quad (8)$$

As an example the $S_{11}$ matrix element for a system consisting of 3 segments, which give rise to 4 interface reflection/transmission events and to 3 propagation events is given. By performing the multiplication of equation 6 the following expression for the $S_{11}$ matrix element is obtained:

$$S_{11} = \frac{\begin{pmatrix} e^{i(\beta_1 z_1 + \beta_2 z_2 + \beta_3 z_3)} + r_4 r_3 e^{i(\beta_1 z_1 + \beta_2 z_2 - \beta_3 z_3)} + \\ r_2 r_3 e^{i(\beta_1 z_1 - \beta_2 z_2 + \beta_3 z_3)} + r_2 r_4 e^{i(\beta_1 z_1 - \beta_2 z_2 - \beta_3 z_3)} + \\ r_1 r_2 e^{-i(\beta_1 z_1 - \beta_2 z_2 - \beta_3 z_3)} + r_1 r_2 r_4 r_3 e^{-i(\beta_1 z_1 - \beta_2 z_2 + \beta_3 z_3)} + \\ r_1 r_3 e^{-i(\beta_1 z_1 + \beta_2 z_2 - \beta_3 z_3)} + r_1 r_4 e^{-i(\beta_1 z_1 + \beta_2 z_2 + \beta_3 z_3)} \end{pmatrix}}{t_1 t_2 t_3 t_4}$$

$$= \frac{1}{t_{sys}}$$

$$= \frac{1}{\sqrt{1 - r_{sys}^2}}$$

which is a sum of complex exponential functions. Since the values for the $r_n$ coefficients and for the propagation constants $\beta_n$, depend directly on the values of the waveguide's transverse dimensions for a given wavelength (from equations 1 and 3), one needs to find the optimum values for these parameters in order to obtain the desired spectral filtering function. One will also have to work out the segment's length values $Z_n$ in order to optimize the spectral response and fit the desired one.

Fitting of $S_{11}$ to a Set of Chosen Data

By using the formulas given above one can develop a simple method for designing a SWAG filter. One imposes a desired reflection or transmission spectral response and one finds through successive iterations the best parameter fits for an $S_{11}$ function similar to the one given above for a 3-segment filter. Of course, when a large number of segments are present the $S_{11}$ summation is very long and consumes much computer time. Several iterative computation procedures are possible. In this case a so-called bisection-type algorithm has been chosen based on an error-reduction parameter. An error parameter is defined by the following expression:

$$\varepsilon = \frac{1}{K} \sum_{k=1}^{K} \left[ S_{11}(\lambda_k) - \frac{1}{t_c(\lambda_k)} \right]^2 = \frac{1}{K} \sum_{k=1}^{K} \left[ S_{11}(\lambda_k) - \frac{1}{(1 - r_c^2(\lambda_k))^{\frac{1}{2}}} \right]^2 \quad (9)$$

where $r_c(\lambda_k)$ is the complex amplitude reflection coefficient chosen at wavelength $\lambda_k$ and $t_c(\lambda_k)$ is the complex amplitude transmission coefficient chosen at $\lambda_k$. By working in reflection or in transmission the algorithm seeks to reduce the value of $\epsilon$ as much as possible. Note here that a weight function could be added to the definition of $\epsilon$ in equation 9 to put an emphasis on some points of the chosen data set.

It is important to note that the smaller the number K of points to fit is in comparison with the number of segments N (K/N ratio), the larger the probability is that the set of approximate waveguide segment parameter values under trial will give the desired spectral response function. In this case the bisection method does not guarantee that the search will converge towards an optimum set of waveguide parameters.

About the Algorithm

The optimization procedure is shortly described here. For this part of the text, it will be assumed that that the transverse dimensions are described here only by $X_n$ and the lengths are still described by $Z_n$.

First, an initial value is assigned randomly to each parameter within acceptable ranges. These ranges are defined by taking into account the important points to consider mentioned earlier. One cannot assign values to the $X_n$s that would lead to large scattering losses. Also, considering the overall number of segments and the minimum length allowed by the fabrication method, one cannot assign values to the $Z_n$s that would lead to an unacceptable overall SWAG length or an unpractical design. Note that it will be of great interest to develop more sophisticated techniques in the future to assign the initial values of the parameters. One can also set those values manually by intuitively selecting certain subsets of interfaces and optical paths.

Once the initial values are set, one can begin to work out the parameters one at a time. Here, it has been chosen to optimize $X_1$ first, and then $Z_1$, and then $X_2$ and $Z_2$, going this way from 1 to N and repeating the procedure as long as the $\epsilon$ parameter does not satisfies these requirements. The smaller $\epsilon$ becomes, the better this SWAG will approximate the desired spectral function. As mentioned earlier, the convergence is not guaranteed. Because the initial values are assigned randomly, it is possible to get a good solution by only trying the procedure a few times even if it doesn't converge the first time. As for the initial parameter value assignments, the art of digital filters in the radio and microwave domains can be of considerable help in their initial selection.

The optimization of a parameter $X_n$ or $Z_n$ is done by alternatively computing the $\epsilon$ parameter for smaller and greater values of the parameter under trial, using a bisection like algorithm. For example, if the computed value of $\epsilon$ is smaller at $X_n - \Delta X_n$, then $X_n$ is replaced by $X_n - \Delta X_n$ and $\epsilon$ is computed again around the new $X_n$ value to find out if there is a more optimal choice elsewhere. With several iterations, the optimal choice $X_n \pm \Delta X_n$ will be closer and closer to $X_n$ and this iterative procedure for the parameter under trial will stop when the requirement on the convergence is met.

It is also important to note that one could optimize the parameters to only get the desired power spectrum response or only the desired phase spectral response by evaluating the error parameter on just the absolute values of $S_{11}$ and $t_{sys}$ (or $r_{sys}$) or just their phases.

Figure 20:
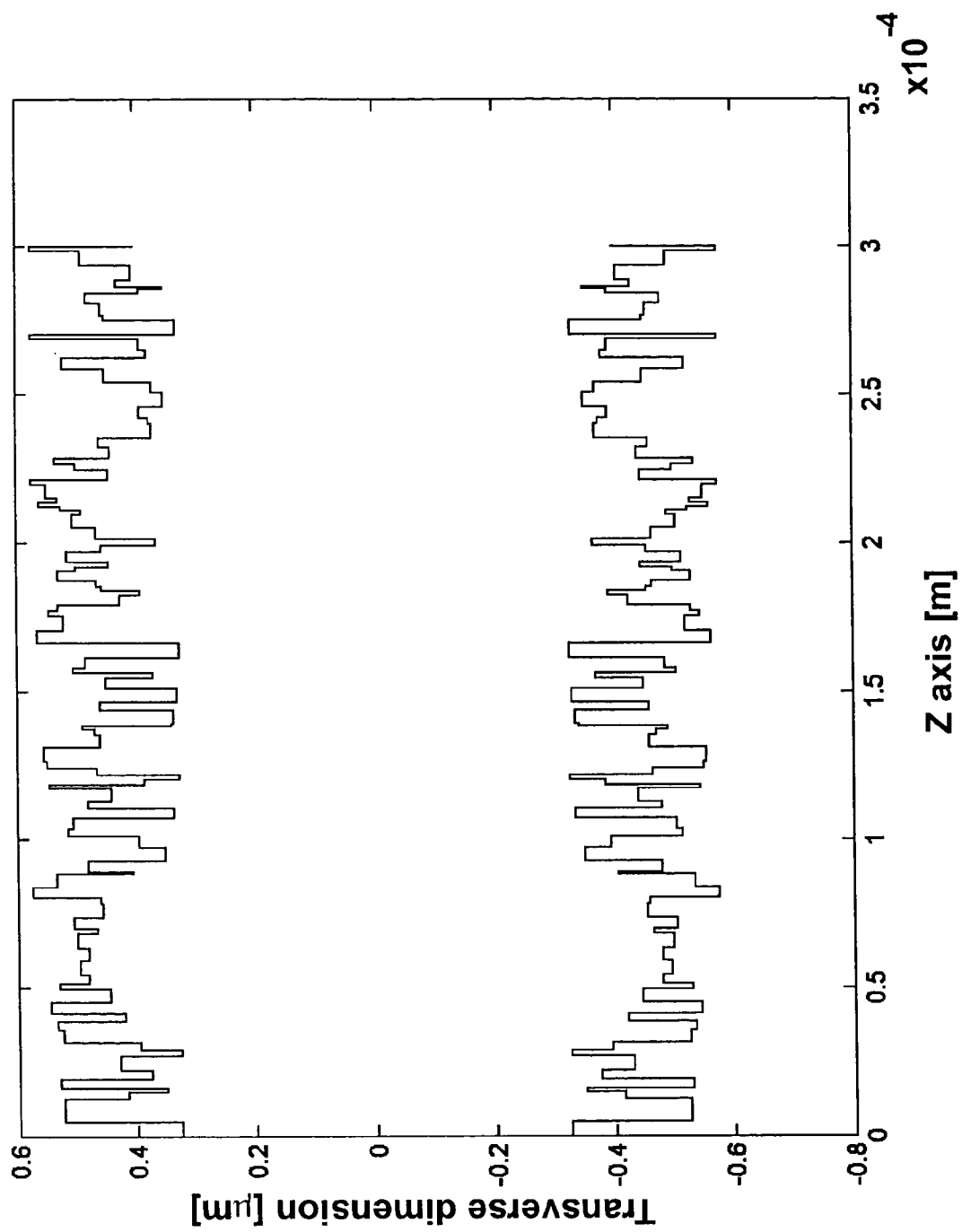
FIG. 20 shows a Swag obtained with the iterative transfer matrix method.
Figure 21:
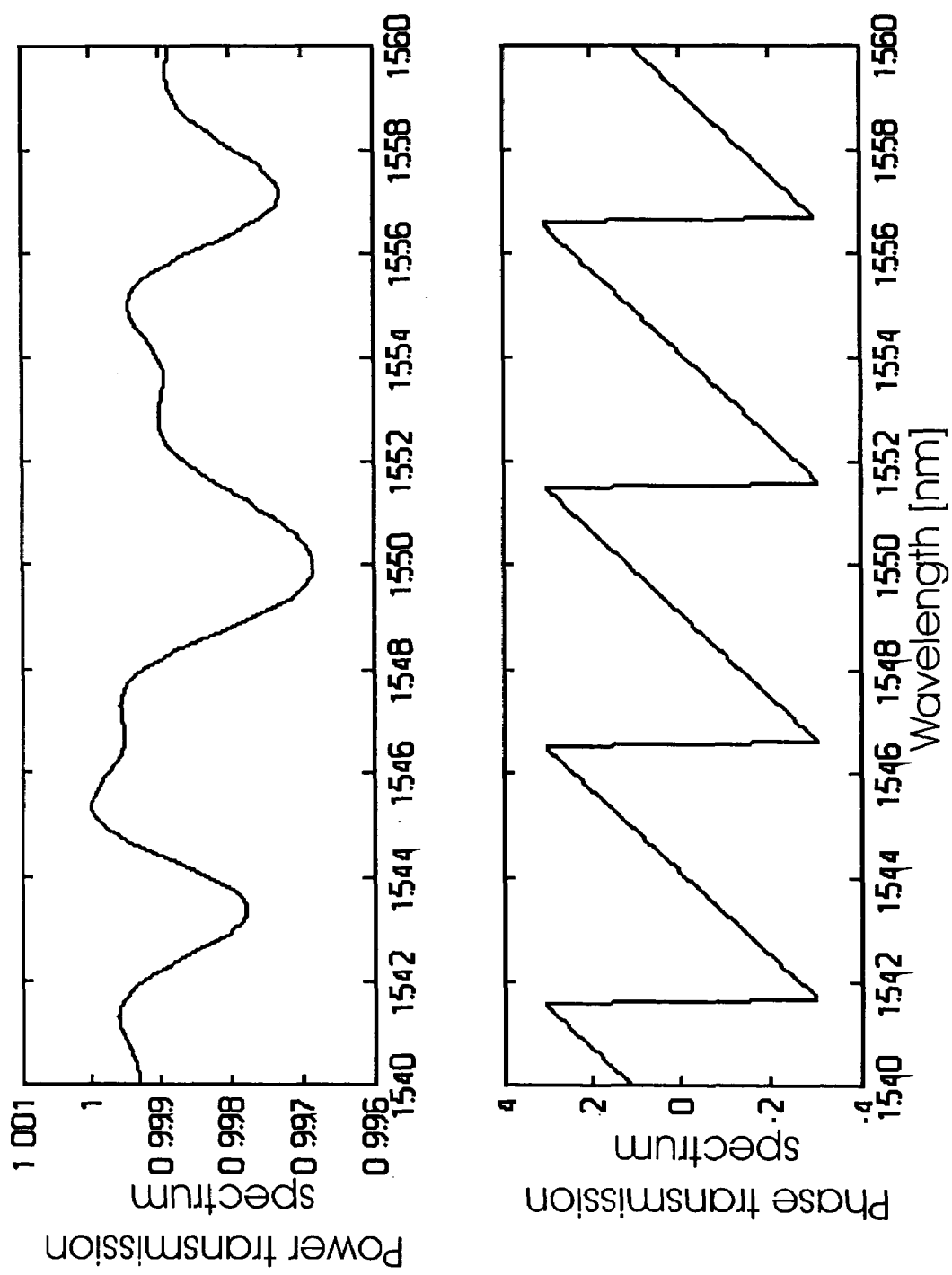
FIG. 21 shows a Transmission spectrum of Swag of FIG. 20.

FIG. 20 shows the Swag obtained by this method when one wants a very high transmission at 1540 nm and 1560 nm with a phase at the output of $\pi/3$ and a transmission of 99% at 1550 nm also with a phase of $\lambda/3$. Sixty segments were considered during the computation. FIG. 21 displays the obtained transmission spectrum.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

The invention claimed is:

1. An optical device for filtering an optical signal, comprising:
an optical input receiving said optical signal;
an elongated waveguide connected to said input and having a transverse dimension modified in abrupt steps so as to create a long sequence of segments, said abrupt steps corresponding to a change in the waveguide transverse dimension occurring along said waveguide in less than one tenth of a wavelength of light in a medium of the waveguide, said abrupt steps defining a plurality of spatially interleaved subsets of sharp optically reflecting interfaces, each one of said subsets having said sharp interfaces placed according to a positioning pattern along the waveguide with an accuracy better than one hundredth of a wavelength in terms of the optical path lengths between interfaces belonging to the same subset, in order to coherently reflect light according to a desired optical spectrum, said spectrum of reflected light occupying spectral regions substantially distinct from the spectral regions where other subsets of said sharp interfaces reflect light, wherein said segments are designed for single transverse mode operation over a full spectral range of interest, wherein a reflected filtered output optical signal is generated, wherein the transverse waveguide dimension varies within a range sufficiently narrow that a mode size remains close to its minimum size and does not deviate by more than five percent over said minimum size for the full optical spectrum;
an optical output connected to said waveguide for providing said filtered optical signal.

2. An optical device as claimed in claim 1, wherein a core of said waveguide is made of aluminosilicate and a cladding of said waveguide is made of silica.

3. An optical device as claimed in claim 1, wherein a core of said waveguide is made of silicon and a cladding of said waveguide is made of silica.

4. An optical device as claimed in claim 1, wherein said input and said output are connected to said waveguide using an optical circulator.

5. A method for filtering an optical signal, comprising:
receiving said optical signal at an input;
providing an elongated waveguide connected to said input, said waveguide having a transverse dimension modified in abrupt steps so as to create a long sequence of segments, said abrupt steps corresponding to a change in the waveguide transverse dimension occurring along said waveguide in less than one tenth of a wavelength of light in a medium of the waveguide, said abrupt steps defining a plurality of spatially interleaved subsets of sharp optically reflecting interfaces, each one of said subsets having said sharp interfaces placed according to a positioning pattern along the waveguide with an accuracy better than one hundredth of a wavelength in terms of the optical path lengths between interfaces belonging to the same subset, in order to coherently reflect light according to a desired optical spectrum, said spectrum of reflected light occupying spectral regions substantially distinct from the spectral regions where other subsets of said sharp interfaces reflect light, wherein said segments are designed for single transverse mode operation over a full spectral range of interest, wherein a reflected filtered output optical signal is generated, wherein the transverse waveguide dimension varies within a range sufficiently narrow that a mode size remains close to its minimum size and does not deviate by more than five percent over said minimum size for the full optical spectrum;
outputting said filtered optical signal through an output connected to said waveguide.

6. A method of fabrication of a optical filter, comprising:
providing an elongated waveguide;
modifying a transverse dimension along said elongated waveguide in abrupt steps so as to create a long sequence of segments, said abrupt steps corresponding to a change in the waveguide transverse dimension occurring along said waveguide in less than one tenth of a wavelength of light in a medium of the waveguide, said abrupt steps defining a plurality of spatially interleaved subsets of sharp optically reflecting interfaces, each one of said subsets having said sharp interfaces placed according to a positioning pattern along the waveguide with an accuracy better than one hundredth of a wavelength in terms of the optical path lengths between interfaces belonging to the same subset, in order to coherently reflect light according to a desired optical spectrum, said spectrum of reflected light occupying spectral regions substantially distinct from the spectral regions where other subsets of said sharp interfaces reflect light, wherein said segments are designed for single transverse mode operation over a full spectral range of interest, wherein a reflected filtered output optical signal is generated, wherein the transverse waveguide dimension varies within a range sufficiently narrow that a mode size remains close to its minimum size and does not deviate by more than five percent over said minimum size for the full optical spectrum.

7. A method as claimed in claim 6, wherein said modifying is done using nanofabrication.

8. A method as claimed in claim 7, wherein said nanofabrication is nanolithography.

9. A method as claimed in claim 6, wherein said modifying is done using imprinting.

10. A method as claimed in claim 6, wherein a core of said waveguide is made of aluminosilicate and a cladding of said waveguide is made of silica.

11. A method as claimed in claim 6, wherein a core of said waveguide is made of silicon and a cladding of said waveguide is made of silica.

12. A method of designing an optical filter, said optical filter having an optical input receiving said optical signal, an elongated waveguide connected to said input and having a transverse dimension modified in abrupt steps so as to create a long sequence of segments, said abrupt steps corresponding to a change in the waveguide transverse dimension occurring along said waveguide in less than one tenth of a wavelength of light in a medium of the waveguide, said abrupt steps defining a plurality of spatially interleaved subsets of sharp optically reflecting interfaces, each one of said subsets having said sharp interfaces placed according to a positioning pattern along the waveguide with an accuracy better than one hundredth of a wavelength in terms of the optical path lengths between interfaces belonging to the same subset, in order to coherently reflect light according to a desired optical spectrum, said spectrum of reflected light occupying spectral regions substantially distinct from the spectral regions where other subsets of said sharp interfaces reflect light, wherein said segments are designed for single transverse mode operation over a full spectral range of interest, wherein a reflected filtered output optical signal is generated, wherein the transverse waveguide dimension varies within a range sufficiently narrow that a mode size remains close to its minimum size and does not deviate by more than five percent over said minimum size for the full optical spectrum; and an optical output connected to said waveguide for providing said filtered optical signal, said method comprising:

providing a desired spectral response;

calculating a transverse dimension profile as a function of said desired spectral response.

13. A method as claimed in claim 12, wherein said calculating comprises iteratively determining, for at least one specific wavelength $\lambda$, a set of length values $Z_n$ for said segments, a set of transverse dimension values $X_n$ and $Y_n$ causing complex amplitude reflection coefficients $r_n$ occurring at a change in the mode's effective index $n_{eff}$ at the abrupt steps in said transverse dimension.

14. A method as claimed in claim 13, wherein said calculating comprises, for a waveguide having at least 5 segments, resolving parameters of a matrix S using $S = I_{N+1} P_N I_N P_{N-1} I_{N-1} \ldots P_3 I_3 P_2 I_2 P_1 I_1$, wherein $$I_n = \frac{1}{t_n}\begin{bmatrix} 1 & r_n \\ r_n & 1 \end{bmatrix}, t_n = \sqrt{1-r_n^2} \text{ and } P_n = \begin{bmatrix} e^{i\beta_n z_n} & 0 \\ 0 & e^{-i\beta_n z_n} \end{bmatrix},$$

and $\beta_n = n_{eff} k_0$, and wherein N is a number of said segments, through the resolution of said transverse dimensions $X_n$ and $Y_n$ and said delays $Z_n$.

15. A method as claimed in claim 13, wherein said set of transverse dimension values $X_n$ and $Y_n$ is equal to a set of transverse dimension values $R_n$ for cylindrical core waveguides.

* * * * *